US012601415B2

(12) United States Patent　　　(10) Patent No.: US 12,601,415 B2

Morris et al.　　　(45) Date of Patent: Apr. 14, 2026

(54) MODULAR VALVE ASSEMBLIES WITH OPTIONAL SWING OUT

(71) Applicant: AUSTRALIAN VALVE GROUP PTY LTD., Kewdale (AU)

(72) Inventors: Peter John Morris, Canning Vale (AU); Marcus Eric Ullrot, Highgate (AU)

(73) Assignee: AUSTRALIAN VALVE GROUP PTY LTD., Kewdale (AU)

( * ) Notice: Subject to any disclaimer, the term of this patent is extended or adjusted under 35 U.S.C. 154(b) by 0 days.

(21) Appl. No.: 18/380,373

(22) Filed: Oct. 16, 2023

(65) Prior Publication Data

US 2024/0035585 A1　　Feb. 1, 2024

Related U.S. Application Data

(63) Continuation of application No. PCT/AU2022/050348, filed on Apr. 15, 2022.

(Continued)

(51) Int. Cl.
*F16K 27/02* (2006.01)
*E03C 1/10* (2006.01)
(Continued)

(52) U.S. Cl.
CPC .......... *F16K 27/0209* (2013.01); *E03C 1/106* (2013.01); *F16K 15/035* (2013.01);
(Continued)

(58) Field of Classification Search
CPC ...... E03C 1/106; F16K 15/066; F16K 15/035; F16K 27/0209; F16K 2200/204; F16K 27/003; F16K 27/0281; E03B 7/077
See application file for complete search history.

(56) References Cited

U.S. PATENT DOCUMENTS 3,173,439 A * 3/1965 Griswold ................ E03C 1/108
　　　　　　　　　　　　　　　　137/107
3,356,337 A 12/1967 Olen
　　　　　　(Continued)

FOREIGN PATENT DOCUMENTS

DE　　19924973　　12/1999
WO　　0070246　　11/2000
WO　　2019171248　　9/2019

OTHER PUBLICATIONS

International Search Report and Written Opinion from PCT/AU2022/050348 mailed Jun. 8, 2022. 14 pages.
(Continued)

*Primary Examiner* — Atif H Chaudry
(74) *Attorney, Agent, or Firm* — Grossman, Tucker, Perreault & Pfleger, PLLC

(57) ABSTRACT

Modular valve assemblies are disclosed. In embodiments the modular valve assemblies include a first frame and a second frame. The first frame includes a fluid inlet and first mount, and the second frame includes a fluid outlet and a second mount. A connection element extends between the first mount and the second mount. At least a first modular block and a second modular block are disposed on the connection element and position between the first and second frame. The first and second modular blocks may each be rotatable about the connection element between a use position and a maintenance position. In the use position, a composite flow path extends from the fluid inlet, through a first fluid flow path in the first modular block, through a second fluid flow path in the second modular block, and to the fluid outlet. Rotation of the first or second modular block to its maintenance position moves the first or second fluid flow path, respectively, out of the composite flow path.

23 Claims, 16 Drawing Sheets

Closed

Related U.S. Application Data

(60) Provisional application No. 63/176,139, filed on Apr. 16, 2021.

(51) Int. Cl.
    F16K 15/03 (2006.01)
    F16K 15/06 (2006.01)
    F16K 37/00 (2006.01)

(52) U.S. Cl.
    CPC ........ *F16K 15/066* (2013.01); *F16K 27/0281* (2013.01); *F16K 37/0083* (2013.01); *F16K 2200/204* (2021.08)

(56) References Cited

U.S. PATENT DOCUMENTS

| | | | | |
|---|---|---|---|---|
| 3,424,430 | A | * | 1/1969 | Hoelsch ................ F16K 27/067 |
| | | | | 251/148 |
| 3,602,247 | A | | 8/1971 | Bunn et al. |
| 3,672,632 | A | | 6/1972 | Chow |
| 6,164,335 | A | * | 12/2000 | Hayashi .............. F15B 13/0857 |
| | | | | 137/884 |
| 6,581,632 | B2 | | 6/2003 | Walpole et al. |
| 7,434,593 | B2 | | 10/2008 | Noll et al. |
| 7,784,483 | B2 | | 8/2010 | Grable et al. |
| 8,333,214 | B2 | | 12/2012 | Ellis |
| 9,523,436 | B2 | | 12/2016 | Mohamed et al. |
| 10,683,859 | B2 | | 6/2020 | Schulz |
| 10,859,078 | B2 | | 12/2020 | Schulz |
| 2003/0089403 | A1 | | 5/2003 | Duncan et al. |
| 2007/0204917 | A1 | | 9/2007 | Clayton et al. |
| 2009/0090415 | A1 | | 4/2009 | Harris et al. |
| 2018/0100597 | A1 | | 4/2018 | Schwartz et al. |

OTHER PUBLICATIONS

International Preliminary Report on Patentability from corresponding PCT Appln. No. PCT/AU2022/050348, dated Oct. 12, 2023. 8 pages.

Supplementary European Search Report from Corresponding European Patent Application 22787172.0, Issued on Feb. 25, 2025. 1 Page.

Extended European Search Report dated Feb. 6, 2025, received in European Patent Application No. 22787172.0, 9 pages.

\* cited by examiner

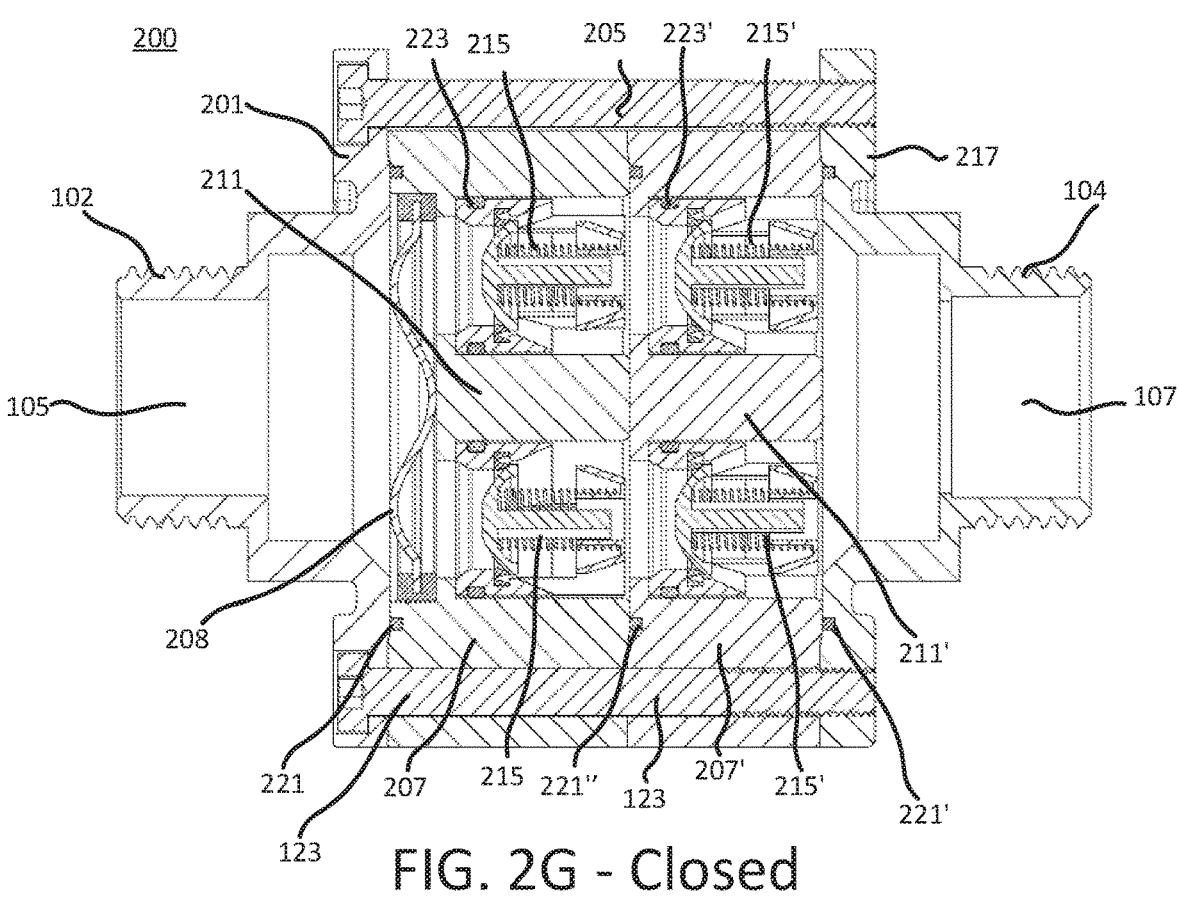
FIG. 2G - Closed
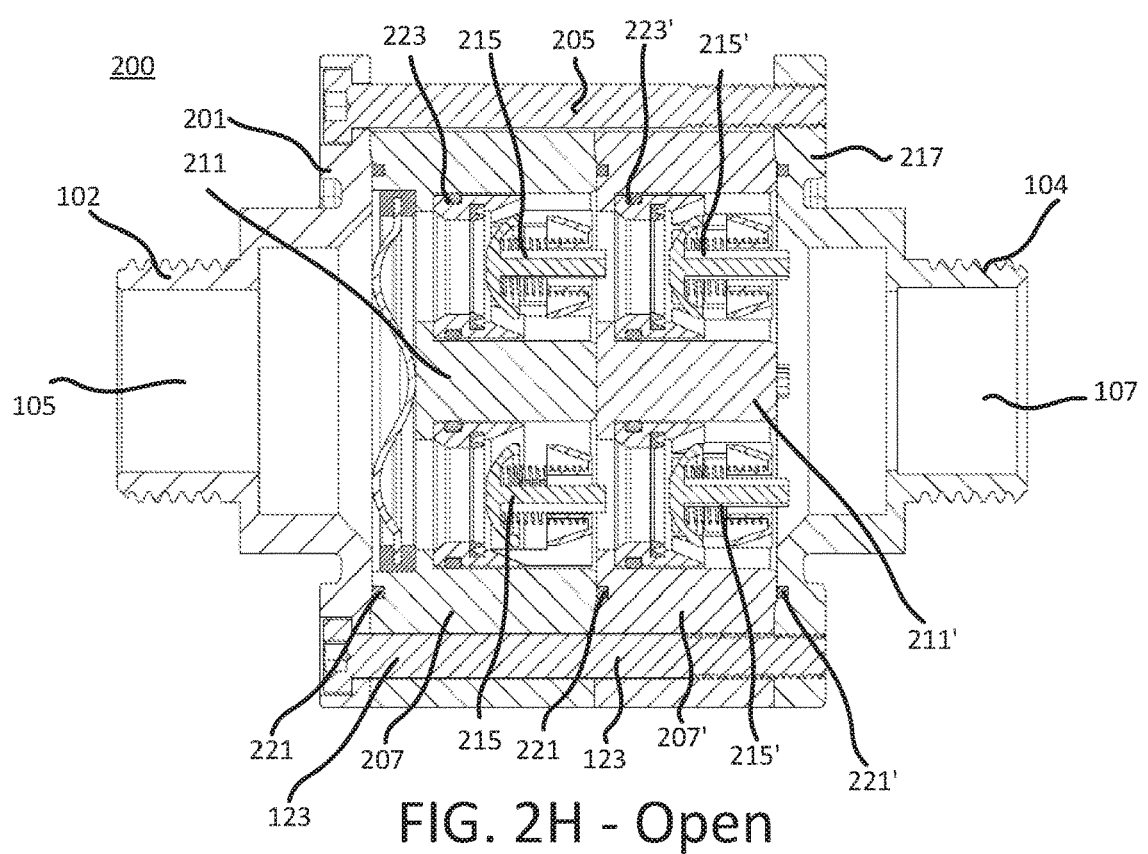
FIG. 2H - Open

400

400

400

500

500

MODULAR VALVE ASSEMBLIES WITH OPTIONAL SWING OUT

CROSS REFERENCE TO RELATED APPLICATIONS

This application is a continuation of PCT Application PCT/AU2022/050348 filed Apr. 15, 2022, which claims priority to U.S. Provisional Patent Application 63/176,139 filed Apr. 16, 2021, both of which are incorporated herein by reference in their entirety.

TECHNICAL FIELD

The present disclosure relates to modular valve assemblies. In particular, the present disclosure relates to modular valve assemblies for controlling the flow of a fluid.

BACKGROUND

Fluid supply systems are often used to convey fluid from a pressurized source such as a municipal water supply to a destination, such as a building or other structure. For example, buildings often include a water supply system that is configured to receive a pressurized supply of water from a municipal water system, and to convey water to various outlets such as toilets, faucets, fire prevention systems, etc., within the building.

Plumbers and plumbing designers are often tasked with controlling the flow of fluid within a building or other structure. To that end, a plumber or plumbing designer may employ a plurality of valves that are fluidly coupled to pipes and other fluid conduits to control fluid flow. For example, plumbers or designers may employ shutoff valves to permit or prevent fluid flow in a fluid system. Likewise, check valves may be employed to permit fluid flow in a first direction through the valve, while preventing backflow of fluid through the valve. Similarly, pressure reducing valves may be used to adjust fluid pressure within all or a part of a fluid system, and strainers may be employed to screen out solids from a fluid.

Although existing plumbing fixtures are useful, they are not without limitations. For example, existing plumbing fixtures may themselves consume a large amount of space, and therefore may be difficult to install in confined spaces. This problem is exacerbated when plumbing fixtures need to be coupled to one another by intervening piping (or other fluid conduit). For example, when a plumbing system calls for the use of a shutoff valve, a check valve, and a pressure reducing valve fluidly coupled in series, it may be necessary for a plumber to connect the shutoff valve to the check valve via a first connecting pipe, and the check valve to the pressure reducing valve via a second connecting pipe. Although such a connection can be reliably made and can result in a functional plumbing assembly, the first and second connecting pipes can increase the cost and extend the overall length of the plumbing assembly.

With the foregoing in mind, a need remains in the art for improved valve assemblies for use in fluid flow applications. The present disclosure is aimed at that need.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 2G is a cross sectional view along plane A-A (shown in FIG. 2E) of the modular valve assembly of FIG. 2A, in an assembled state with all modular blocks in a use position and check valves therein in a closed position;

FIG. 2H is a cross sectional view along plane A-A (shown in FIG. 2E) of the modular valve assembly of FIG. 2A, in an assembled state with all modular blocks in a use position and check valves therein in an open position;

Figure 1:
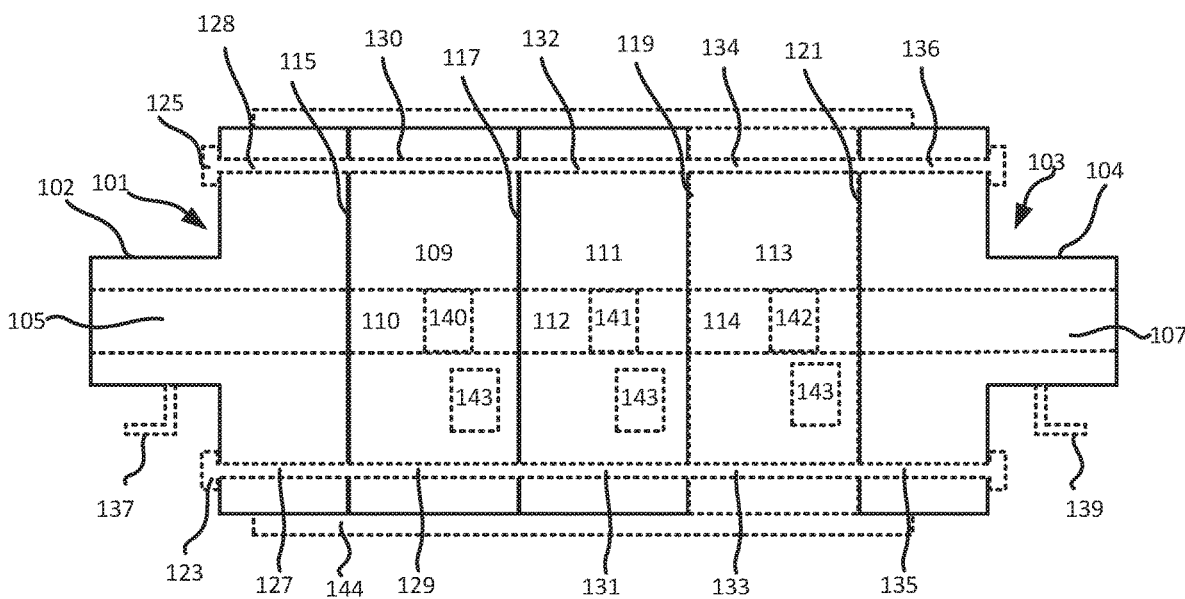
FIG. 1 is a schematic drawing of one example of modular valve assembly consistent with the present disclosure.

Although the following Detailed Description will proceed with reference being made to illustrative embodiments, many alternatives, modifications and variations thereof will be apparent to those skilled in the art.

DETAILED DESCRIPTION

Aspects of the present disclosure relate to modular valve assemblies. As will be clear from the following description, the modular valve assemblies described herein can provide significant flexibility for the construction and/or design of a fluid flow system, such as a plumbing system for a building. In particular, the modular valve assemblies described herein can enable a plurality of modular blocks that include at least one fluid control fixture to be arranged in series with one another, thereby enabling control over fluid flow through the assembly. In embodiments, the modular blocks form part of a composite fluid flow channel and may be fluidly coupled to at one another without the need for intervening piping or other fluid conduits. Consequently, the modular valve assemblies can be relatively small and/or short, as compared to a similar assembly produced with currently known fixtures and connecting conduits.

The modular blocks may be configured such that they can independently or collectively move between a use position and a maintenance position. When all the modular blocks are in their respective use position, a composite fluid flow path may be defined through the assembly. The composite flow path may extend from an inlet of the assembly, through one or more modular blocks, and to an outlet of the assembly. When a modular block is moved to its maintenance position, a fluid flow path therein may be moved out of the composite fluid flow path, but may allow the internal components of the modular block (e.g., valves, springs, etc. therein) to be readily accessed, e.g., for maintenance and/or replacement.

In embodiments the modular valve assemblies described herein include a first frame with a first inlet and a first mount, and a second frame with a second inlet and a second mount.

A connection element extends between the first mount and the second mount. At least a first modular block and a second modular block are disposed on the connection element and are positioned between the first frame and the second frame. The first and second modular blocks are each (e.g., independently) rotatable about the connection element between a use position and a maintenance position. When the first and second modular blocks are both in the use position, a composite fluid flow path extends from the fluid inlet, through a first fluid flow path in the first modular block, through a second fluid flow path in the second modular block, and to the outlet. Rotation of the first modular block or the second modular block to their maintenance position moves the first fluid flow path or the second fluid flow path, respectively, out of the composite flow path.

The first and second modular blocks can include one or more fixtures for controlling the flow of fluid. Non-limiting examples of such fixtures include check valves, pressure reducing valves, pressure relief valves, reduced pressure zones, cutoff valves, strainers, combinations thereof, and the like. Without limitation, in embodiments the first modular block includes at least one first check valve. In those or other embodiments, the second modular block may include at least one second check valve.

In some embodiments the first fluid flow path includes a plurality of first flow channels. In such instances the first modular block may include a plurality of first check valves (and/or other fixtures), wherein each of the plurality of first flow channels includes at least one of the plurality of first check valves (and/or other fixtures). Without limitation, in embodiments the first modular block may include a first flow divider that defines at least a portion of the plurality of first flow channels.

In those or other embodiments the second fluid flow path (through at least a portion of the second modular block) may include a plurality of second flow channels. In such embodiments the second modular block may include a plurality of second check valves (and/or other fixtures), wherein each of the plurality of second flow channels includers at least one of the plurality of second check valves (and/or other fixtures). The second modular block may include a second flow divider that defines at least a portion of the plurality of first flow channels. At least one of the plurality of first flow channels may be axially aligned with a corresponding one of the plurality of second fluid flow channels. Without limitation, in embodiments each of the plurality of first flow channels is axially aligned with a corresponding one of the plurality of second flow channels.

The first and second modular blocks include a first body and a second body, respectively. In such instances, the connection element may be in the form of a first rod or other elongate member that extends at least partially through at least a first portion of the first mount, a first portion of the first body, a first portion of the second body, and a first portion of the second mount. In those or other embodiments the modular valve assembly may further include a retention element that is movable between an installed position and a withdrawn position. In the installed position, the retention element prevents rotation of at least the first and second modular blocks about the connection element. When the retention element is in the withdrawn position, the first and second modular blocks can be rotated about the connection element. In embodiments the retention element is in the form of a second rod or other elongate member that extends at least partially through at least a second portion of the first mount, a second portion of the first body, a second portion of the second body, and a second portion of the second mount.

In embodiments the modular assembly further includes an abutment member that extends between the first mount and the second mount. In such instances the abutment member is configured to abut at least a portion of the first and second modular blocks when the first and second modular blocks are in the use position. For example, the first and second modular blocks may include first and second shoulders, respectively. In such instances the abutment member may be configured to abut the first and second shoulders when the first and second modular blocks are in the use position. In that way, the abutment member may permit rotation of a modular block around a connection element in a first direction from a use position to a maintenance position. In addition, the abutment member may permit rotation of the modular block in a second direction (e.g., opposite the first direction) around the connection element from the maintenance position to a use position. Once modular block is in the use position, however, the abutment member may prevent or substantially prevent further rotation of the modular block about the connection element in the second direction.

In embodiments one or more of the modular blocks may include features that enable testing of one or more valves or other components therein. Thus, for example, in embodiments at least one of the first modular block and the second modular block include a test cock. In other embodiments, both the first modular block and the second modular block include a test cock.

As noted above the first modular block and/or the second modular block may include at least one valve, such as a check valve. With that in mind, the first and second modular blocks may include fixtures other than or in addition to a (e.g., check) valve. For example, in embodiments at least one of the first modular block and the second modular block include a pressure relief valve, a strainer, a pressure reducing valve, combinations thereof, and the like, wherein such fixtures may be used alone or in combination with a valve such as a check valve.

The modular blocks described herein may have any suitable shape. In embodiments, the modular blocks have a geometric or irregular cross-sectional shape. For example, the modular blocks may have a one, three, four, five, six, or more sided cross-sectional shape. Non-limiting examples of such shapes include circular, oval, ellipsoidal, triangular, quadrilateral (e.g., square, rectangular, rhomboid, etc.), pentagonal, hexagonal, etc. shapes. Without limitation in embodiments the modular blocks described herein have a one sided, three sided, or four-sided cross-sectional shape, such as but not limited to a circular, oval, triangular, or quadrilateral (e.g., square or rectangular) cross-sectional shape.

In embodiments the modular valve assemblies include more than two modular blocks on the connection element. For example, the modular valve assemblies may include a third modular block disposed on the connection element. The third modular block may be (e.g., independently) rotatable about the connection element between a use and a maintenance position. In such instances when the first, second, and third modular blocks are in the use position (or their respective use positions), a composite fluid flow path may extend from the fluid inlet, through the first fluid flow path in the first modular block, through the second fluid flow path in the second modular block, and through a third fluid flow path in the third modular block. Rotation of the third block to the maintenance position moves the third fluid flow path out of the composite flow path.

The modular blocks may be arranged on the connection element in any order. In embodiments, the first and second modular blocks are arranged in series on connection element, with the first modular block proximate the fluid inlet and the second modular block proximate the fluid outlet. Alternatively, the second modular block may be proximate the fluid inlet and the first modular block may be proximate the fluid outlet. In embodiments where three or more modular blocks are used, the modular blocks may also be arranged in any order on the connection element. For example, the first modular block may be proximate the fluid inlet, the second modular block may be proximate the fluid outlet, and a third modular block may be between the first and second modular blocks. In any case, the modular blocks may be arranged in series on the connection element. In that context the phrase "in series" means that the modular blocks are arranged such that individual flow paths therein can form at least a portion of a composite flow path when the modular blocks are each in their respective use position.

In embodiments the modular valve assemblies described herein include a first, second, and third modular blocks arranged in series on the connection element, wherein the third modular block is between the first and second modular blocks, and each of the first, second, and third modular blocks is rotatable about the connection element between a use position and a maintenance position. In such embodiments, the first modular block may include at least one first check valve, the second modular block may include at least one second check valve, and the third modular block may include at least one third check valve.

In embodiments the first, second and third modular blocks may include respective first, second, and third flow paths. In embodiments the at least one first check valve, at least one second check valve, and at least one third check valve include a plurality of first, second, and third check valves, respectively, and the first, second, and third flow paths include a plurality of first, second, and third flow channels, respectively. In such instances each of the plurality of first, second, and third flow channels include a corresponding one of the plurality of first, second, and third check valves, respectively. In some embodiments, at least one of the plurality of first flow channels is axially aligned with a respective one of the plurality of second flow channels and a respective one of the plurality of third flow channels. In those or other embodiments, each of the plurality of first flow channels is axially aligned with a respective one of the plurality of second flow channels and a respective one of the plurality of third flow channels.

The modular blocks described herein may include one or more testable fixtures, such as but not limited to a testable check valve, testable ball valve, testable pressure reducing valve, testable pressure relief valve, a reduced pressure zone or the like. In such instances, the modular blocks may include a test cock or other structure that enables testing of a valve or other fixture therein. For example, in embodiments where the modular valve assembly includes a first, second and optionally a third modular block, any or all such modular blocks may include a test cock. Without limitation, in embodiments all the modular blocks in the modular valve assemblies described herein include at least one test cock.

While the modular valve assemblies can advantageously include modular blocks that are rotatable about a connection element, such a configuration is not required, and the modular valve assemblies may be configured differently. For example, the modular valve assemblies may include modular blocks that can be supported on one or more connection elements, and which can be removed (e.g., by sliding or in another manner) from the connection element(s), e.g., to facilitate maintenance.

For example, in embodiments the modular valve assemblies described herein include a first frame and a second frame. The first frame includes a fluid inlet and a first mount, and the second frame includes a fluid outlet and a second mount. A connection element extends between the first mount and the second mount. At least a first modular block and a second modular block are disposed on the connection element and are each positioned between the first frame and the second frame. The first modular block includes a first fluid flow path, and the second modular block includes a second fluid flow path. The modular valve assembly includes a composite flow that that extends from the fluid inlet, through the first and second fluid flow paths, and to the fluid outlet. Modular valve assemblies configured in this manner (i.e., which do not require modular blocks that are rotatable about a connection element) can include any or all the same features described herein for use with modular valve assemblies that include modular blocks that are rotatable about a connection element. Such elements are therefore not reiterated in the interest of brevity.

FIG. 1 is a schematic diagram of one example of a modular valve assembly consistent with the present disclosure. As shown, modular valve assembly 100 includes a first frame 101 and a second frame 103. The first and second frames 101, 103 are generally configured to provide an inlet and an outlet, respectively, for the flow of fluid into and out of modular valve assembly 100. First frame 101 includes a first (inlet) connection 102, and second frame 103 includes a second (outlet) connection 104. First connection 102 is configured to fluidly connect to a source of fluid, such as but not limited to a source of liquid or gas (e.g., a water supply, gas supply, or the like). Second connection 104 is configured to fluidly connect to one or more components downstream of modular valve assembly 100. An inlet fluid flow path 105 extends through at least a portion of first frame 101, and an outlet fluid flow path 107 extends through at least a portion of second frame 103. In embodiments and as shown, the inlet fluid flow path 105 extends between first and second openings (not labeled) in first frame 101, and the outlet fluid flow path 107 extends between first and second openings (also not labeled) in second frame 103.

First and second frames 101, 103 are also configured to couple to at least one modular block. Preferably, first and second frames 101, 103, are configured to connect to one or more modular blocks, wherein each modular block includes a fluid flow path there through. In that regard, first frame 101 includes a first mount (not labeled in FIG. 1) and second frame 103 includes a second mount (also not labeled in FIG. 1). The first and second mounts are generally configured to couple (e.g., directly couple) first and second frames 101, 103, respectively, to one or more modular blocks. For example, modular valve assembly 100 may include a first modular block 109, a second modular block 111, and optionally a third modular block 113. In embodiments and as shown in FIG. 1, first frame 101 (or, more particularly, the mount thereof) may couple directly to first modular block 109, and second modular block 111 may couple (e.g., directly couple) to optional third modular block 113. In such instances, third modular block 113 may couple directly to second frame 103 (or, more particularly, the mount thereof). In such a configuration, a first interface 115 may be present between first modular block 109 and first frame 101, a second interface 117 may be present between first modular block 109 and second modular block 111, a third interface 119 may be present between second modular block 111 and optional third modular block 113, and a fourth interface 121 may be present between optional third modular block 113 and second frame 103. Alternatively when optional third modular block 113 is omitted, second modular block 111 may couple (e.g., directly couple) to second frame 103 (or, more particularly, to the mount thereof), such that third interface 119 is formed between second modular block 111 and second frame 103. In any case, fluid tight seals may be formed at the interfaces between a frame and a modular block and between adjacent modular blocks. In that regard, sealing elements (e.g., O-rings, gaskets, etc.) may be used at the interfaces between a frame and a modular block and between adjacent modular blocks to prevent leakage of fluid at such interfaces.

A first fluid flow path 110 extends through at least a portion of first modular block 109, a second fluid flow path 112 extends through at least a portion of second modular block 111, and a third fluid flow path 114 extends through at least a portion of optional third modular block 113. In general, the first, second, and third fluid flow paths 110, 112, 114 are each configured to provide a pathway for the conveyance of fluid through their respective modular blocks. For the sake of clarity and ease of understanding, first, second, and third fluid flow paths 110, 112, 114 are illustrated in FIG. 1 as straight flow paths that extend from a first opening in one side of their respective modular block to a second opening in another (e.g., opposite) side of their respective modular block. Moreover, the first, second, and third fluid flow paths 110, 112, and 114 each axially aligned with one another—meaning that an axis (e.g., a longitudinal axis) extending through one of the fluid flow paths (e.g., fluid flow path 110) will also extend through the other fluid flow paths in other modular blocks (e.g., through second and optional third fluid flow paths 112, 114). Such a configuration is not required, however, and first, second, and optional third fluid flow paths 110, 112, and 114 may have any suitable configuration.

Modular valve assembly 100 further includes a connection element 123, which extends between first frame 101 and second frame 103. Connection element 123 is generally configured to couple to or otherwise support one or more modular blocks that are disposed between first and second frames 101, 103. For example, connection element 123 may support one or more (and preferably all) of first modular block 109, second modular block 111, and optional third modular block 113 between the first and second frames 101, 103. In embodiments connection element 123 includes or is in the form of an elongate member such as a rod that extends between first frame 101 (or a mount thereof) and second frame 103 (or a mount thereof), and which supports one or more modular blocks. In embodiments and as shown in FIG. 1, first mounting channels 127, 129, 131, 133, 135 may be formed through at least a portion of first frame 101, first modular block 109, second modular block 111, optional third modular block 113, and second frame 103, respectively, and may be configured to receive at least a portion of connection element 123 therein. As shown, when the first mounting channels 127, 129, 131, 133, 135 are axially aligned, connection element 123 may extend at least partially through each of such mounting channels.

Notably and as will be explained in further detail later, the modular blocks described herein (e.g., first, second, and optionally third modular blocks 109, 111, 113) may be rotatable about the connection element 123 between a use position and a maintenance position. In the use position, a fluid flow path extending at least partially through a modular block may form part of a composite flow path that extends between the inlet fluid flow path 105 and the outlet fluid flow path 107 of the modular valve assembly. When a modular block is moved to its maintenance position, however, at least one fluid flow path therein is moved out of the composite flow path. For example, FIG. 1 depicts an embodiment in which all the first, second, and optionally third modular blocks 109, 111, 113, are in their respective use positions. When first, second, and optionally third modular blocks 109, 111, and 113 are in that position, the first, second, and third fluid flow paths 110, 112, 114 therein are in fluid communication with each other, with inlet fluid flow path 105, and with outlet fluid flow path 107. As a result, a composite fluid flow that extends through at least a portion of modular valve assembly 100 is formed, and includes inlet fluid flow path 105, first, second, and optional third fluid flow paths 110, 112, 114, and outlet fluid flow path 107.

As will be described later in connection with other embodiments, when a modular block is moved to its maintenance position (e.g., by rotation about connection element 123), the fluid flow channel therein may be moved out of the composite fluid flow path. For example, when first modular block 109 is moved (e.g., rotated about connection element 123) from its use position to its maintenance position, the first fluid flow path 110 therein is moved out of the composite flow path. Likewise, when second modular block 111 and/or optional third modular block 113 is/are moved (e.g., rotated above connection element 123) from their respective use positions to their respective maintenance positions, the second fluid flow path 112 or third fluid flow path 114, respectively, is moved out of the composite flow path. As may be appreciated, movement of a modular block to its maintenance position results in a break in the continuity of the composite flow path but can permit ready access to internal components of that modular block, e.g., for maintenance and/or replacement thereof.

Modular valve assembly 100 may further include one or a plurality of retention elements, wherein each retention element is movable between a first and second position. In the first position the retention element may be configured to retain one or more modular blocks in the modular valve assembly in its use position. In contrast when a retention is element is in the second position, one or more modular blocks in the modular valve assembly may be moved from its use position to its maintenance position. One example of this concept is shown in FIG. 1, which depicts modular valve assembly 100 as including a single retention element 125. In this embodiment, retention element 125 is in the form of a rod or other elongate member that can extend between first frame 101 (or a mount thereof) and second frame 103 (or a mount thereof), and which can extend through at least a portion of first modular block 109, second modular block 111, and optional third modular block 113.

For example and as shown in FIG. 1, second mounting channels 128, 130, 132, 134, 136 may be formed through at least a portion of first frame 101, first modular block 109, second modular block 111, optional third modular block 113, and second frame 103, respectively. The second mounting channels 128, 130, 132, 134, 136 are configured to align with one another when first, second, and optional third modular blocks 109, 111, and 113 are in their use positions. When first, second, and optional third modular blocks 109, 111, 113 are so positioned, an end of retention element 125 may be inserted into second mounting channel 128 and the retention element 125 may be advanced to the first position in which it extends at least partially through second mounting channels 128, 130, 132, 134, and 136. When retention element 125 is in the first position, rotation of first, second, and optionally third modular blocks 109, 111, 113 about connection element 123 may be prevented or substantially prevented.

When it is desired to move a modular block to a maintenance position, retention element 125 may be moved to a second position in which it does not extend through a second mounting channel in the modular block that is to be moved to the maintenance position. For example when it is desired to move optional third modular block 113 to the maintenance position, retention element 125 may be withdrawn from at least second mounting channel 134, thus enabling rotation of optional third modular block 113 about connection element 123. Likewise to enable movement of second and first modular blocks 109, 111 to their respective maintenance positions, retention element 125 may be withdrawn from second mounting channels 132 and 130, respectively. Put differently, retention element 125 may be moved to a second position that is withdrawn from one or more of second mounting channels 130, 132, 134, to enable one or more of first, second, and optionally third modular blocks 109, 111, and 113 to rotate about connection element 123.

The modular blocks and optionally the frames described herein may include one or more fixtures for controlling or otherwise impacting fluid flow through one or more parts of modular valve assembly 100. Non-limiting examples of fixtures that may be included in the modular blocks and/or frames include shutoff valves, check valves, pressure reducing valves, strainers, reduced pressure zones, combinations thereof, and the like. For example and as shown in FIG. 1, first frame 101 may include an optional first shutoff valve 137 and second frame 103 may include an optional second shutoff valve 139. In general, optional first and second shutoff valves 137, 139 are configured to permit or prevent the flow of fluid through inlet fluid flow path 105 or outlet fluid flow path 107, respectively. Any suitable shutoff valve may be used as optional first and second shutoff valves 137, 139. In embodiments first and second shutoff valves include a ball valve that is moveable between an open position (in which fluid can flow through inlet fluid flow path 105 or outlet fluid flow path 107, respectively) and a closed position (in which fluid flow through one or both of inlet fluid flow path 105 and outlet fluid flow path 107 is prevented).

While FIG. 1 shows first and second frames 101, 103 as each including a single optional shutoff valve 137, 139, such a configuration is not required and first and second frames 101, 103 may be configured differently. For example, first and second frames 101, 103 may include another fixture (e.g., a check valve, pressure reducing valve, strainer, etc.), either alone or in addition to an optional shutoff valve. Moreover, first and second frames 101, 103 can be configured to include the same or different types of fixtures, depending on the desired application.

As further shown in FIG. 1, first modular block 109 may include one or more first fixtures 140, second modular block 111 may include one or more second fixtures 141, and optional third modular block may include one or more third fixtures 142. The nature and type of fixtures used in first, second, and third fixtures 140, 141, 142 is not limited, and such fixtures may include one or more of the fixtures noted above. Without limitation, in embodiments at least one of first, second, and third fixtures 140, 141, and 142 include at least one check valve, and in some embodiments the one of more of the first, second, and third fixtures 140, 141, 142 include one or a plurality of check valves. For example, in embodiments first fixture 140 is or includes a first check valve (either alone or in combination with another fixture type, such as a strainer), second fixture 141 is omitted or includes a second check valve and/or another fixture type, and optional third fixture 142 is omitted or includes a third check valve and/or another type of fixture. In other embodiments, first fixture 140 includes a first check valve, second fixture 141 includes a second check valve, and third fixture 142 is omitted or includes a third check valve and/or another fixture type.

In embodiments one or more of first flow path 110, second fluid flow path 112, and optional third fluid flow path channel 114 include a plurality of flow channels. For example, first flow path 110 may include a plurality of first flow channels that extend at least partially through first modular block 109. Similarly, second fluid flow path 112 and third fluid flow path 114 may include a plurality of second flow channels and a plurality of third flow channels, respectively. For example, the first modular block 109, second modular block 111, and optional third modular block 113 may each include a flow divider that defines at least a portion of the corresponding plurality of first, second, and third flow channels. More specifically, first modular block 109 may include a first flows divider that divides first fluid flow path 110 into a plurality of first flow channels. Likewise, second and third modular blocks 111, 113 may include a second and third flow divider, respectively, wherein the second flow divider divides second fluid flow path 112 into a plurality of second flow channels and the third flow divider divides third fluid flow path 114 into a plurality of third flow channels.

In embodiments first fluid flow path 110 includes a plurality of first flow channels. In such instances, all or a portion of the first fluid channels may include a first fixture 140, such as a check valve, pressure reducing valve, strainer, shutoff valve, combination thereof, and like. For example, in embodiments first fluid flow path 110 includes a plurality of first flow channels, wherein each of the plurality of first flow channels include a first check valve, either alone or in combination with another fixture type. Likewise, when second fluid flow path 112 includes a plurality of second flow channels, some or all the second fluid channels may include a second fixture 141. For example, some or all the second fluid channels may include a second check valve, either alone or in combination with another fixture type. Optional third modular block 113 may be configured similarly, e.g., when third fluid flow path 114 includes a plurality of third fluid channels.

In embodiments, first and second fluid flow paths 110, 112 include a plurality of first and second flow channels, respectively, and optional third modular block is included or omitted from modular valve assembly 100. In such embodiments each of the first flow channels include a corresponding one of a plurality of first check valves, and each of the second flow channels include a corresponding one of a plurality of second check valves. In embodiments where third modular block 113 is included, its third fluid flow path 114 may include a plurality of third flow channels, each of which may include a respective one of a plurality of third check valves. Alternatively or additionally, the plurality of third flow channels may each include a respective one of a plurality of pressure reducing valves.

In still other embodiments, first fluid flow path 110 includes a plurality of first flow channels, wherein each of the plurality of flow channels include a respective one of a plurality of check valves. In such embodiments, second modular block 111 may include a second fluid flow path 112 that includes at least pressure reducing valve. For example, second fluid flow path 112 may include a plurality of second flow channels, wherein each of the plurality of second flow channels includes a respective one of a plurality of pressure reducing valves.

In still other embodiments, first modular block 109 includes at least one first check valve, second modular block 111 includes a pressure relief valve (either alone or in combination with at least one other fixture such as at least one second check valve), and optional third modular block 113 is included or omitted. For example, the first fluid flow path 110 and second fluid flow path 112 may include a plurality of first flow channels and a plurality of second flow channels, respectively, wherein the plurality of first flow channels each include a respective one of a plurality of first check valves, the plurality of second flow channels each include a respective one of a plurality of second check valves, and second modular block 111 further includes a pressure relief valve. In such embodiments, optional third modular block 113 may be included or omitted.

In embodiments the fluid flow paths and/or flow channels in first, second, and optional third modular blocks 109, 111, 113 are axially aligned with one another. For example, in embodiments when first and second fluid flow paths include a plurality of first and second flow channels, respectively, all or a portion of the first flow channels may be axially aligned with a respective one of the plurality of second flow channels. As noted above, a first flow channel is axially aligned with a second flow channel when an axis that extends through an inlet and outlet opening of the first flow channel also passes through an inlet and outlet opening of a corresponding second flow channel. FIG. 1 illustrates an example in which first, second, and third fluid flow paths 110, 112, 114 include a single flow channel, wherein the first fluid flow path 110 is axially aligned with second fluid flow path 112 and optional third fluid flow path 114.

The modular blocks described herein may be configured to enable testing of one or more fixtures therein. In that regard, the modular blocks may include one or more test cocks or other features that enable testing/evaluation of the operation of a fixture therein. This concept is illustrated in FIG. 1, which shows first, second, and optional third modular blocks 109, 111, 113 as optionally including a test cock 143. While each of first, second, and optional third modular blocks are illustrated as optionally including a single test cock 143, such a configuration is not required, and any suitable number of test cocks may be employed.

The modular valve assemblies described herein may optionally include a housing. When used, the housing may be configured to be movable between an installed position and an access position. In the installed position, the housing may cover at least a portion of the modular blocks and/or frames of the modular valve assembly. In the access position, the housing may be removed or withdrawn, permitting access to the modular blocks and/or frames of the modular valve assembly. This concept is illustrated in FIG. 1, which illustrates modular valve assembly 100 as optionally including housing 144. When housing 144 is in an installed position (as shown in FIG. 1), it may cover all or a portion of an outer surface of first frame 101, first, second, and optional third modular blocks 109, 111, 113, and second frame 103. When housing 144 is moved to a withdrawn position (e.g., by removing it from modular valve assembly 100 or sliding it axially), all or a portion of the outer surface of first frame 101, first, second, and optional third modular blocks 109, 111, 113, and/or second frame 103 may be revealed, permitting access thereto by a user.

For the sake of clarity FIG. 1 illustrates modular valve assembly 100 as including first and second modular blocks 109, 111, and optionally a third modular block 113. Such a configuration is not required, however, and the modular valve assemblies described herein may include any suitable number of modular blocks. For example, the modular valve assemblies described herein may include 1, 2, 3, 4, 5, 6, 7, 8, 9, 10 or more modular blocks, each of which may include one or more fluid flow paths (which may be divided into a plurality of flow channels), as well as one or more fixtures in the fluid flow paths/flow channels.

For the sake of clarity, a variety of example modular valve assemblies will now be described. Such examples are for the sake of understanding only and the modular valve assemblies of the present disclosure are not limited thereto. Moreover, one of ordinary skill in the art will appreciate and envision that various modifications may be made to the described examples to arrive at a modular valve assembly that is suitable for a particular application.

Example 1

Figure 2A:
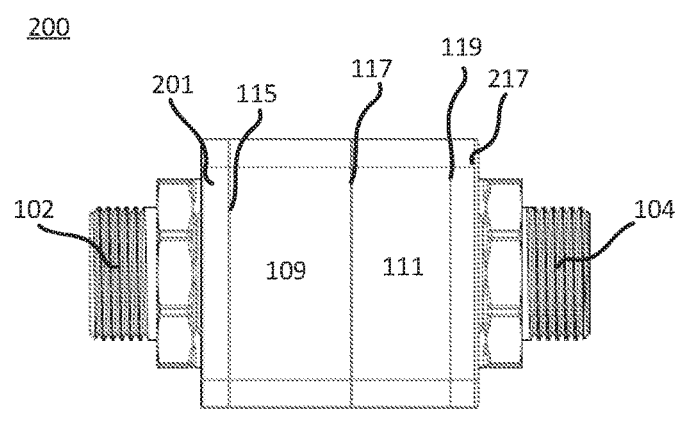
FIG. 2A is a side view of another example of a modular valve assembly consistent with the present disclosure in an assembled state.
Figure 2B:
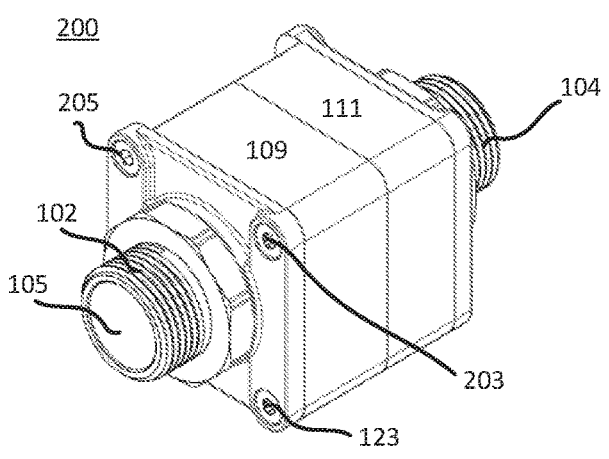
FIG. 2B is a top right side perspective view of the modular valve assembly of FIG. 2A, in an assembled state with all modular blocks in a use position.
Figure 2C:
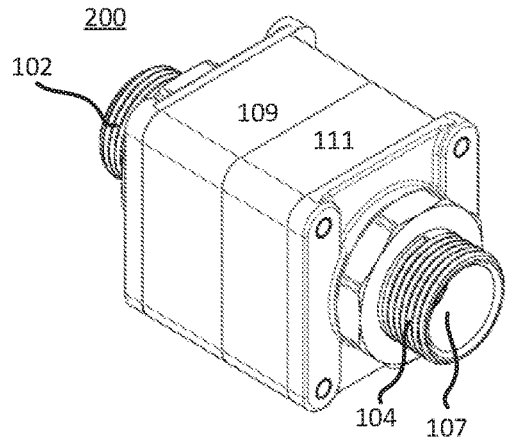
FIG. 2C is a top left side perspective view of the modular valve assembly of FIG. 2A, in an assembled state with all modular blocks in a use position.
Figure 2D:
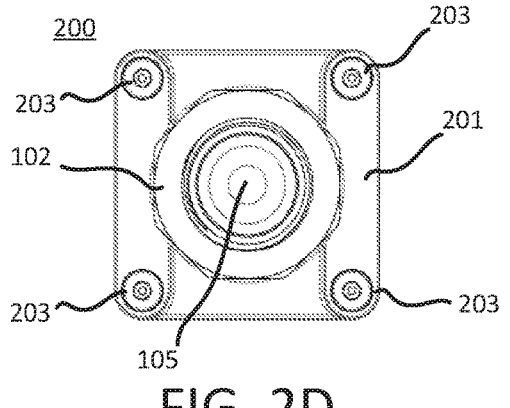
FIG. 2D is a left side view of the modular valve assembly of FIG. 2A, in an assembled state with all modular blocks in a use position.
Figure 2E:
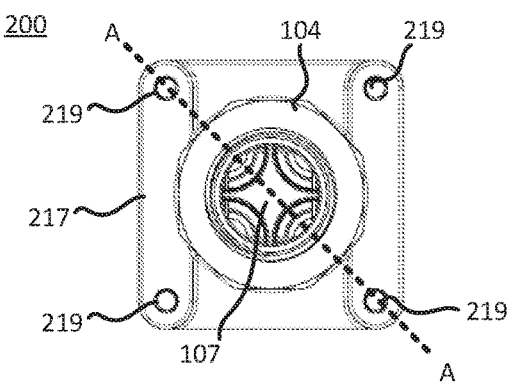
FIG. 2E is a right side view of the modular valve assembly of FIG. 2A, in an assembled state with all modular blocks in a use position.
Figure 2F:
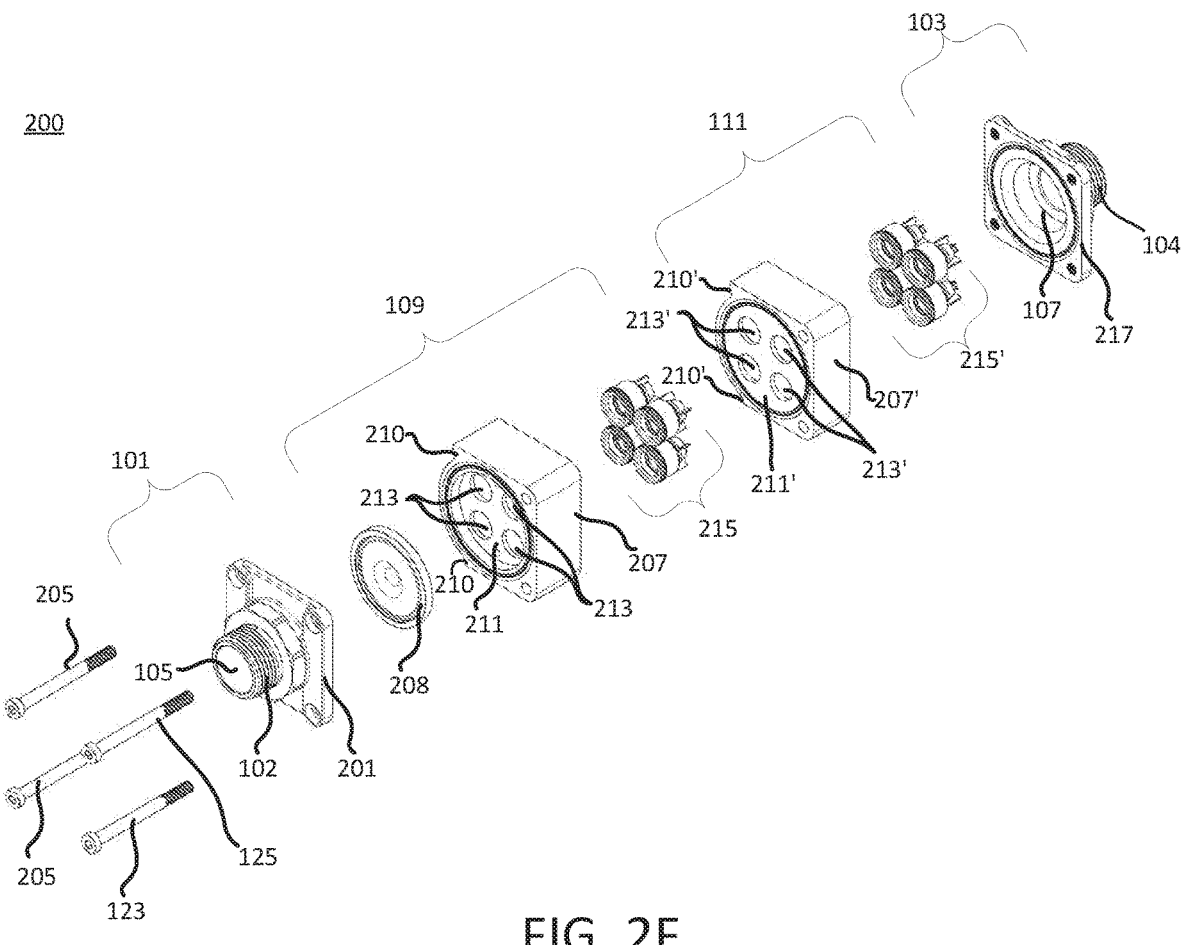
FIG. 2F is an exploded view of the modular valve assembly of FIG. 2A.

FIGS. 2A-2J illustrates a first example of a modular valve assembly consistent with the present disclosure. As best shown in FIG. 2F, modular valve assembly 200 includes a first frame 101, a second frame 103, a first modular block 109, a second modular block 111, a connection element 123, a retention element 125, and two abutment members 205.

First frame 101 includes an inlet connection 102, an inlet fluid flow path 105, and a first mount 201. Likewise, second frame 103 includes an outlet connection 104, an outlet fluid flow path 107, and a second mount 217. As best shown in FIGS. 2D and 2E, first frame 101 further includes a plurality of first receptacles 203 and second frame 103 further includes a plurality of second frame receptacles 219.

First modular block 109 includes a first body 207 with a first fluid flow path extending therethrough. A first flow divider 211 (integral with or separate from first body 207) divides the first fluid flow path into a plurality of first flow channels 213. Each of the first flow channels 213 includes a respective one of a plurality of first check valves 215, as best shown in FIGS. 2G and 2H. First modular block 109 further includes a strainer 208, which is configured to fit within the first fluid flow path on an inlet side of first body 207, i.e., upstream of first flow divider 211 as best shown in FIG. 4H. First body 207 further includes first and second mounting channels (not labeled), which are configured to receive at least a portion of one of connection element 123 and retention element 125 therethrough. In addition, first body 207 includes first shoulders 210, which are configured to abut one of abutment members 205 when first modular block is in its use position.

Second modular block 111 is configured similarly to first modular block 109 but does not include a strainer. As shown, second modular block 111 includes a second body 207' with a second fluid flow path extending therethrough. A second flow divider 211' (integral with or separate from second body 207') divides the second fluid flow path into a plurality of second flow channels 213', each of which is axially aligned with a respective one of first flow channels 213. Each of the second flow channels 213' includes a respective one of a plurality of second check valves 215', as best shown in FIGS. 2G and 2H. Second body 207' further includes first and second mounting channels (not labeled), which are configured to receive at least a portion of one of connection element 123 and retention element 125 therethrough. In addition, second body 207' includes second shoulders 210', which are configured to abut one of abutment members 205 when second modular block is in its use position. The first and second check valves 215, 215' are configured to move between an open position (shown in FIG. 2G) and a closed position (shown in FIG. 2H). The nature and configuration of first and second check valves 215, 215' are not limited, and any suitable type of check valve may be used.

FIGS. 2A-2E and 2G-2J show modular valve assembly 200 in an assembled condition. As shown in FIGS. 2A-2E, 2G, and 2H, first frame 101, first modular block 109, second modular block 111, and second frame 103 are arranged in series on connection element 123. As best shown in FIGS. 2G and 2H, connection element 123 extends through one of the first and second frame receptacles 203, 219, and through corresponding mounting channels within the first and second bodies 108, 108' of first and second modular blocks 109, 111.

Retention element 125 is movable between an installed position and a withdrawn position. In the installed position, retention element 125 extends through a portion of first frame 101, first modular block 109, second modular block 111, and second frame 103. This concept is best shown in FIG. 2B, which depicts retention element 125 extending through another of the first and second frame receptacles 203, 219 in first and second frames 101, 103, and through corresponding mounting channels within the first and second bodies 207, 207' of first and second modular blocks 109, 111. In the withdrawn position (shown in FIGS. 2I and 2J), retention element 125 does not extend through at least one of the first and second frame receptacles 203, 219, and does not extend through at least one of the mounting channels within the first body 207 or second body 207'. Without limitation, in the withdrawn position retention element 125 preferably does not extend through the first and second frame receptacles 203, 219, and does not extend through any of the mounting channels within the first body 207 or second body 207'.

Figure 2I:
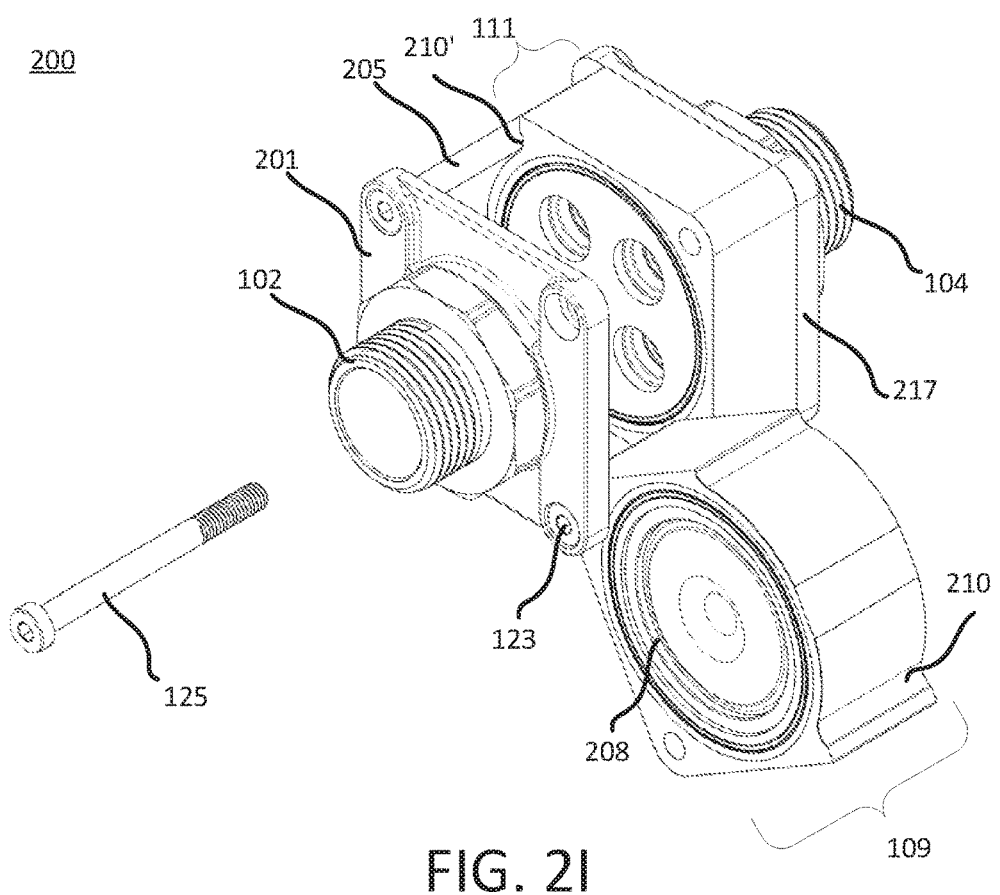
FIG. 2I is a perspective view of the modular valve assembly of FIG. 2A, in an assembled state with a first modular block in a maintenance position and a second modular block in a use position.
Figure 2J:
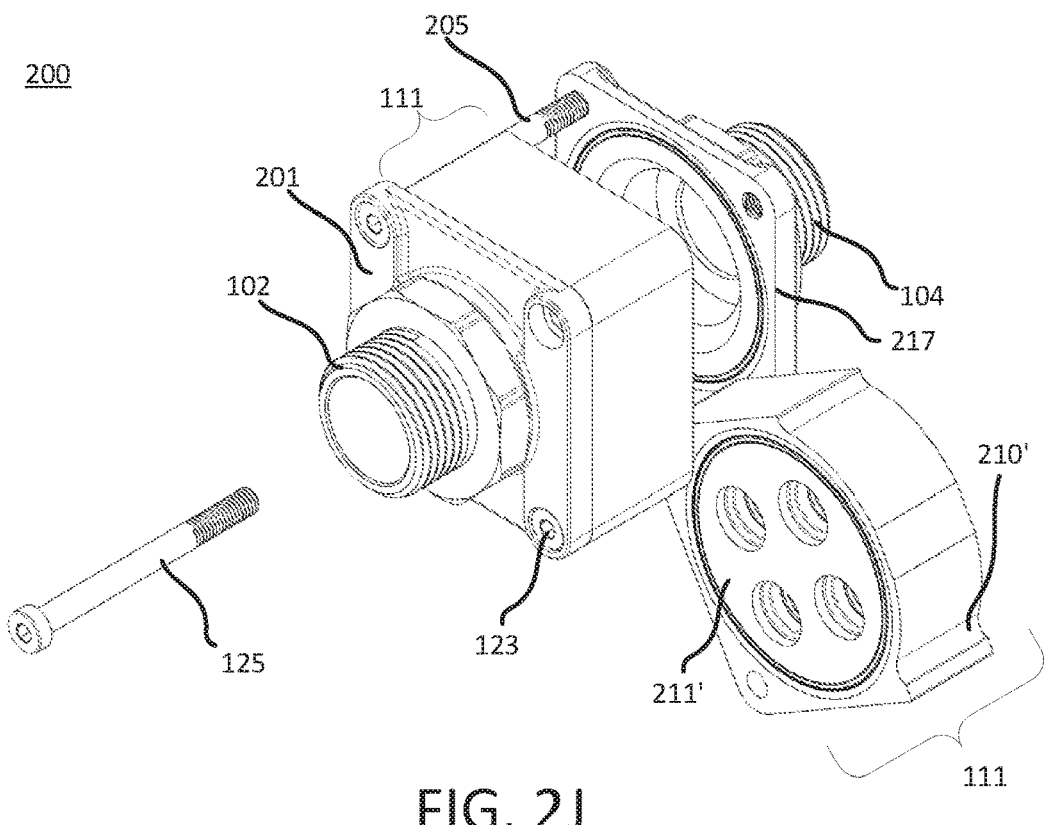
FIG. 2J is a perspective view of the modular valve assembly of FIG. 2A, in an assembled state with a first modular block in a use position and a second modular block in a maintenance position.

Notably when retention element 125 is in the withdrawn position, at least one of first modular block 109 and second modular block 111 may rotate about connection element 123 from their use position (shown in FIGS. 2A-2E, 2G, and 2H), to their maintenance position (shown in FIGS. 2I and 2J). When first modular block 109 and second modular block 111 are in their respective maintenance position (again, shown in FIGS. 2I and 2J), internal components of such modular blocks may be accessed by a user. In contrast when first modular block 109 and second modular block 111 are in their use position, the flow channels therein may be aligned with each other and with the inlet fluid flow path 105 and outlet fluid flow path 107, to form a composite flow channel through modular valve assembly 200.

In this example first body 207 and second body 207' have a quadrilateral shape. Such a configuration is not required, however, and first and second body 207, 207' may have any suitable shape, such as a one, three, four five, six, or more sided geometric shape, or an irregular shape.

As noted above, modular valve assembly 200 further includes two abutment members 205. As best shown in FIGS. 2G-2J, the abutment members 205 extend between first and second frames 101, 103, and through a pair of first and second frame receptacles 203, 219. Unlike connection element 123 and retention element 125, however, abutment members 205 do not extend through a portion of the first body 207 of first modular block 109 or the second body 207' of second modular block 111. Rather, abutment members 205 are configured and positioned such that when first modular block 109 and second modular block are in their use position, first shoulders 210 and second shoulders 210' of the first and second bodies 207, 207' abut a respective one of abutment members 205. This concept is best shown in FIGS. 2G-2J. As shown in FIGS. 2I and 2J, an abutment member 205 abuts first shoulder 210 and/or second shoulder 210' when first modular block 109 and second modular block 111 is/are in their use position. However, abutment member 205 does not abut first shoulder 210 or second shoulder 210', respectively, when first or second modular block 109, 111 is/are in their respective maintenance position.

Connection element 123, retention element 125, and abutment members 205 in this example are in the form of a fastener such as a threaded rod (e.g., a screw, bolt, etc.) that can be tightened to urge first frame 101 and second frame 103 towards each other, compressing first modular block 109 and second modular block 111 therebetween when such modular blocks are in their respective use positions. As best shown in FIG. 2A, in such a condition modular valve assembly 200 includes a first interface 115, second interface 117, and third interface 119. The first interface 115 is formed between the mount 201 of first frame 101 and a first side of first body 207 of first modular block 109. Second interface 117 is formed between a second side of first body 207 of first modular block 109 and a first side of the second body 207' of second modular block 111. The third interface 119 is formed between a second side of second body 207' and second mount 217 of second frame 103. One or more seals may be provided at such interfaces to limit or prevent leakage of fluid. This concept is best shown in FIGS. 2G and 2H, which illustrates the use of a first interface seal 221 between first frame 101 (e.g., first mount 201) and first modular block 109; second interface seal 221' between second frame 103 (e.g., second mount 217) and second modular block 111, and a third interface seal 221" between first modular block 109 and second modular block 111. In this example, first, second, and third interface seals 221, 221', 221" are in the form of O-rings, but any suitable type of seal may be used.

First check valves 215 and second check valves 215' are configured to be insertable and removable from a corresponding one of first flow channels 213 and second flow channels 213'. One or more valve seals may be provided around a periphery of each of the first and second check valves 215, 215' to prevent leakage of fluid between a first/second check valve and a wall of the first/second flow channel in which it is disposed. This concept is shown in FIGS. 2G and 2H, which show the use of first valve seals 223 and second valve seals 223' to form a seal between a respective one of first/second check valves 215, 215' and the wall of a corresponding one of first/second flow channels 213, 213'. In this example first and second valve seals 223, 223' are O-rings, but any suitable type of seal may be used.

As will be appreciated from the foregoing, first frame 101, first modular block 109, second modular block 111, and second frame 103 may be arranged in series on connection element 123. When first and second modular blocks 109, 111 are in their respective use position, the first frame 101, first modular block 109, second modular block 111, and second frame 103 may be urged together by tightening one or more of connection element 123, retention element 125, and/or abutment members 205, resulting in the formation of a composite flow path as discussed above. When maintenance of modular valve assembly 200 is needed, retention element 125 may be removed, connection element 123 may be loosened, and first and/or second modular blocks 109, 111 may be rotated about connection element 123 to their respective maintenance position, as shown in FIGS. 2I and 2J.

Example 2

Figure 3A:
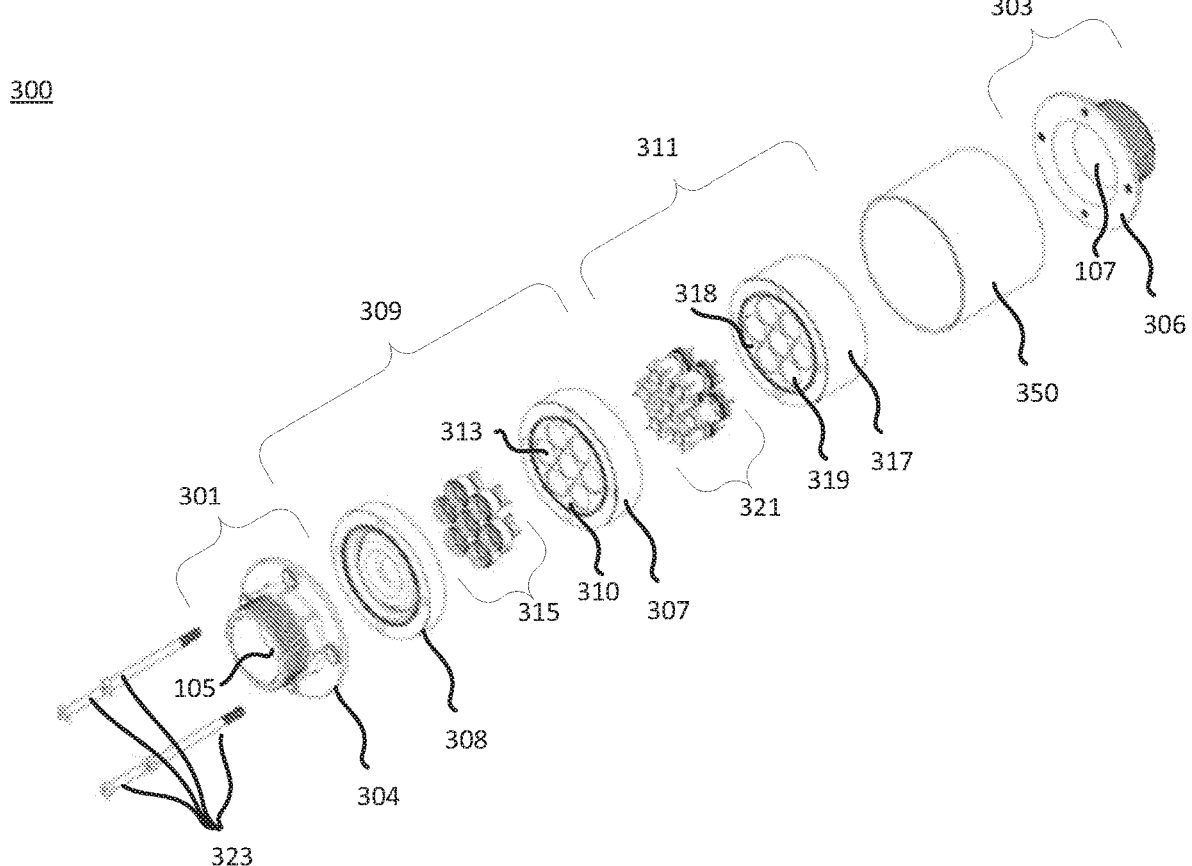
FIG. 3A is an exploded view of another example of a modular valve assembly consistent with the present disclosure.
Figure 3B:
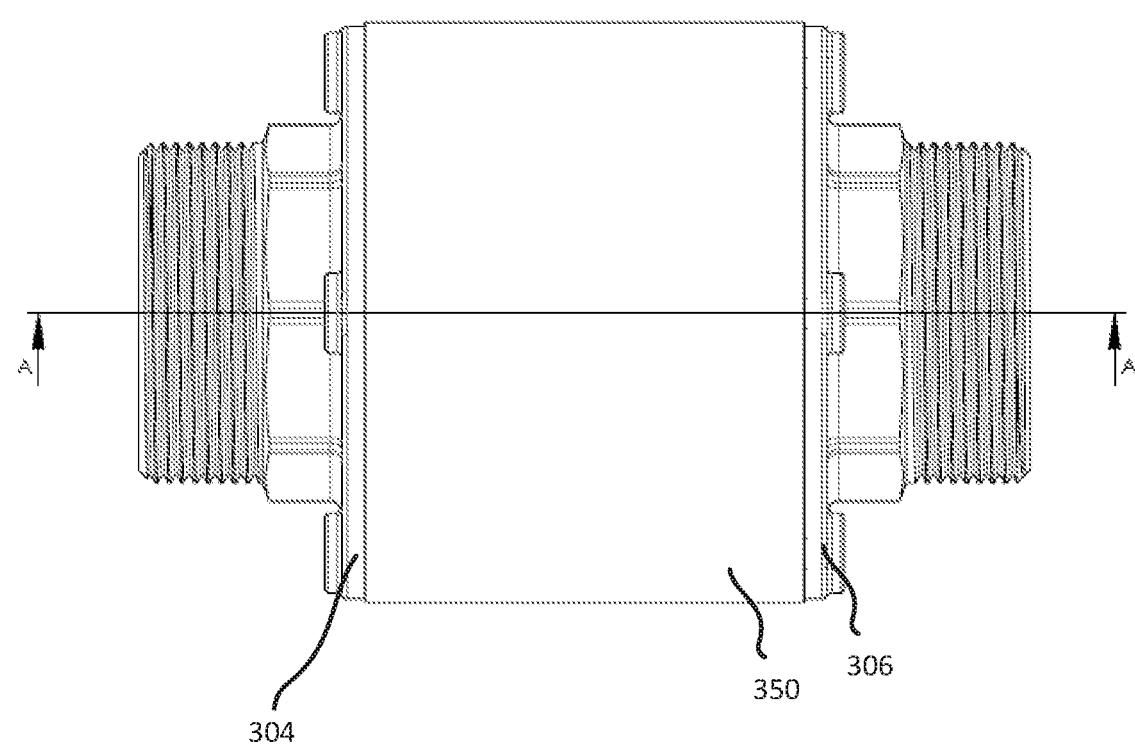
FIG. 3B is a top view of the modular valve assembly of FIG. 3B in an assembled state and with all blocks in a use position.
Figure 3C:
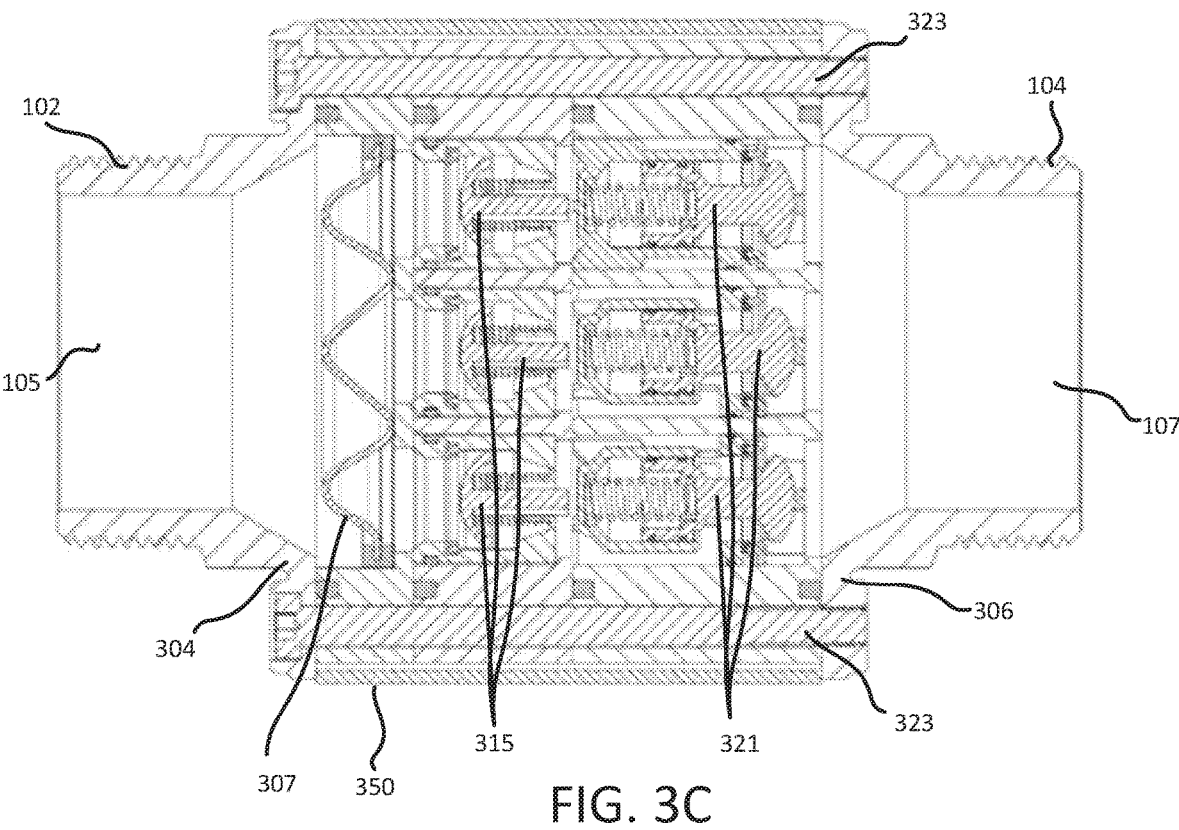
FIG. 3C is cross sectional diagram of the modular valve assembly of FIG. 3A along plane A-A shown in FIG. 3B, with all modular blocks in a use position and check valves therein in an open position.

FIGS. 3A-3C illustrate a second example of a modular valve assembly consistent with the present disclosure. As best shown in FIG. 3A, modular valve assembly 300 includes a first frame 301, a second frame 303, a first modular block 309, a second modular block 311, a plurality of connection elements 323, and a housing 350. First frame 301 includes an inlet connection (not labeled) that includes an inlet fluid flow path 105, and a first mount 304. Likewise, second frame 303 includes an outlet connection (not labeled) that includes an outlet fluid flow path 107, and a second mount 306. The first and second mounts 304, 306 are each in the form of a flange that is configured to engage with one of first modular block 309 and second modular block 311. First and second frames 301, 303 further include a plurality of receptacles (not labeled) for receiving connection elements 323. Housing 350 is configured to cover at least a portion of the outer surface of first and second modular blocks 309, 311 when modular valve assembly 300 is in an assembled state and housing 350 is in an installed condition as shown in FIG. 3B. Housing 350 may be removed, e.g., by sliding laterally over first frame 301 and/or second frame 303 to reveal one or more of first and second modular blocks 309, 311.

First modular block 309 includes a first body 307 with a first fluid flow path extending therethrough. A first flow divider 310 (integral with or separate from first body 307) divides the first fluid flow path into a plurality of first flow channels 313. Each of the first flow channels 313 includes a respective one of a plurality of check valves 315. The nature and configuration of check valves 315 are not limited and any suitable check valves can be used. First modular block 309 further includes a strainer 308. Strainer 308 is configured to axially align with and abut a first side of first body 307 (i.e., upstream of first flow divider 310). First body 307 and strainer 308 each further include a plurality of mounting channels (not labeled), which are configured to receive one of connection elements 323 therethrough.

Second modular block 311 includes a second body 317 with a second fluid flow path extending therethrough. A second flow divider 318 (integral with or separate from second body 317) divides the second fluid flow path into a plurality of second flow channels 319, each of which is axially aligned with a respective one of first flow channels 313. Each of the second flow channels 319 includes a respective one of a plurality of pressure reducing valves 321. The nature and configuration of pressure reducing valves 321 are not limited, and any suitable pressure reducing valves may be used. Second body 317 further includes a plurality of mounting channels (not labeled), which are configured to receive one of connection elements 323 therethrough.

As best shown in FIG. 3C, the components of modular valve assembly 300 may be assembled by inserting connection elements 323 through receptacles and mounting channels of first frame 301, first modular block 309, second modular block 311, and second frame 303. Connection elements 323 may each be in the form of a fastener (e.g., a threaded rod such as a screw, bolt or the like) which can be tightened to urge first frame 301 and second frame 303 towards one another. More specifically, connection elements 323 may urge first frame 301 and second frame 303 towards one another such that first mount 304 abuts a first side of first modular block 309, a second side of first modular block 309 abuts a first side of second modular block 311, and a second side of modular block 311 abuts second mount 306. Seals such as O-rings (shown in FIG. 3C but not labeled) are provided at the interfaces between first mount 304 and first modular block 309, between first and second modular blocks 309, 311, and between second modular block 311 and second mount 306, to prevent leakage of fluid. In this condition, housing 350 may be disposed over at least a portion of the exterior of the first and/or second modular blocks 309, 311.

When maintenance of first or second modular blocks 309, 311 is needed, housing 350 and three connection elements 323 may be removed and the remaining connection element 323 may optionally be loosened. At that point, the first or second modular blocks 309, 311 may be rotated about the remaining connection element 323, exposing the internal components thereof.

Example 3

Figure 4A:
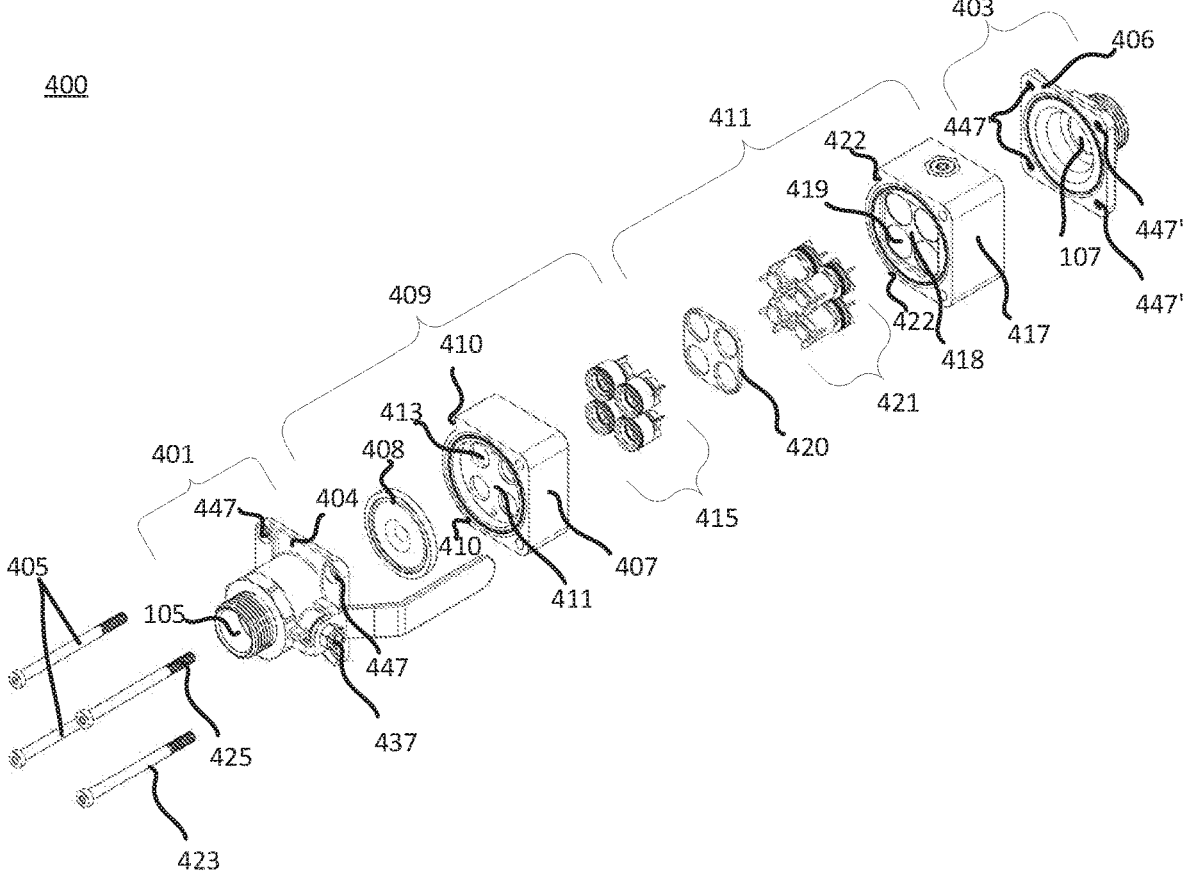
FIG. 4A is an exploded view of another example modular valve assembly consistent with the present disclosure.
Figure 4B:
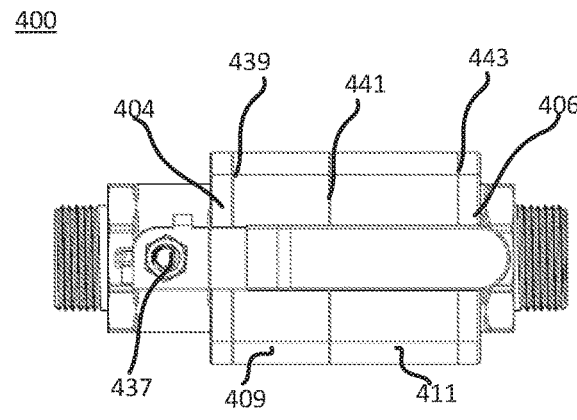
FIG. 4B is a front view of the modular valve assembly of FIG. 4A in an assembled state and with all modular blocks in a use position.
Figure 4C:
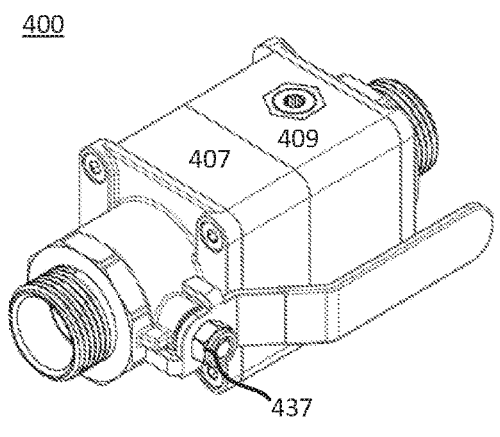
FIG. 4C is a front left side perspective view of the of the modular valve assembly of FIG. 4A in an assembled state and with all modular blocks in a use position.
Figure 4D:
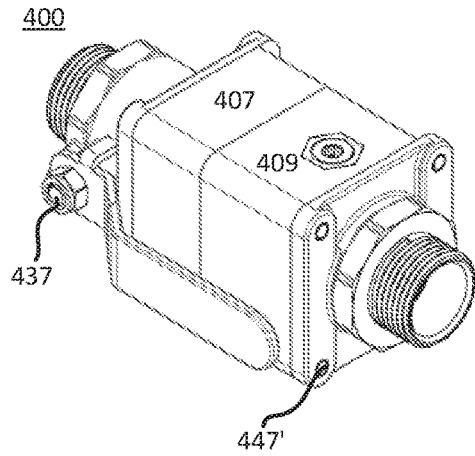
FIG. 4D is a front right side perspective view of the modular valve assembly of FIG. 4A in an assembled state and with all modular blocks in a use position.
Figure 4E:
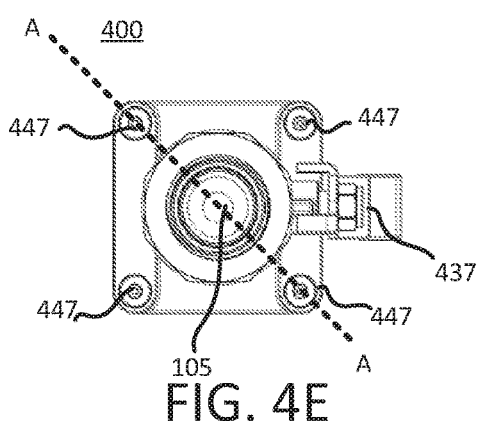
FIG. 4E is a left side view of the modular valve assembly of FIG. 4A in an assembled state and with all modular blocks in a use position.
Figure 4F:
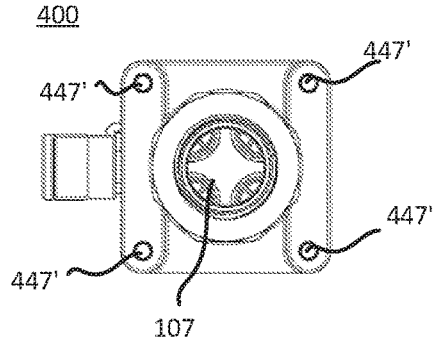
FIG. 4F is a right side view of the modular valve assembly of FIG. 4A in an assembled state and with all modular blocks in a use position.
Figure 4G:
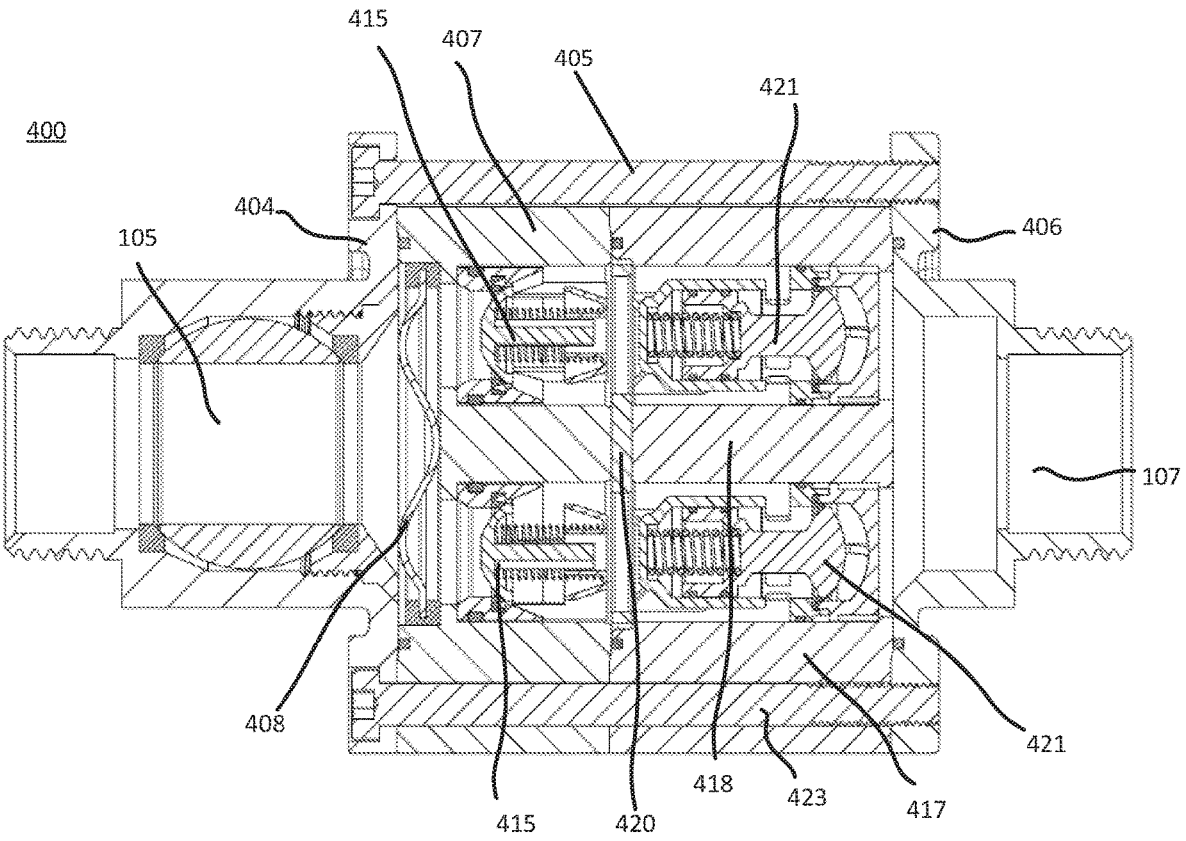
FIG. 4G is a cross sectional view of the modular valve assembly of FIG. 4A in an assembled state, with all modular blocks in a use position and taken along plane A-A shown in FIG. 4E.
Figure 4H:
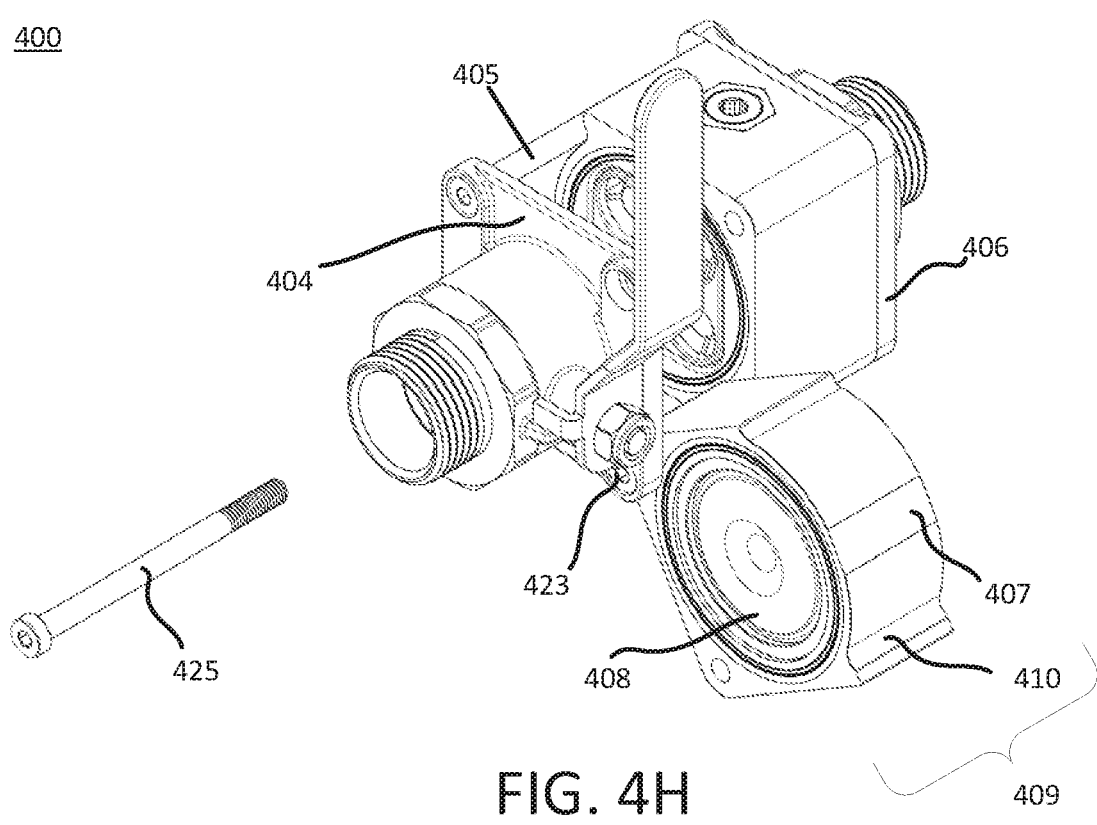
FIG. 4H is a front left side perspective view of the modular valve assembly of FIG. 4A in an assembled state, with a first modular block in a maintenance position and a second modular block in a use position.

FIGS. 4A-4I illustrate a third example of a modular valve assembly consistent with the present disclosure. With reference to FIG. 4A, modular valve assembly 400 includes a first frame 401, a second frame 403, a first modular block 409, a second modular block 411, a connection element 423, a retention element 425, and two abutment members 405.

First frame 401 includes an inlet connection, an inlet fluid flow path 105, and a first mount 404, and a shutoff valve 437. Similarly, second frame 403 includes an outlet connection, an outlet fluid flow path 107, a second mount 406. The shutoff valve 437 may be any type of valve that can move permit or prevent the flow of fluid through inlet fluid flow path 105, such as but not limited to a ball valve. As best shown in FIGS. 4E and 4F, first frame 401 further includes a plurality of first frame receptacles 447 and second frame 403 further includes a plurality of second frame receptacles 447'. The first and second frame receptacles 447, 447' are generally configured to receive one of connection element 423, retention element 425, or abutment members 405.

First modular block 409 includes a first body 407 with a first fluid flow path extending therethrough. A first flow divider 412 (integral with or separate from first body 407) divides the first fluid flow path into a plurality of first flow channels 413. Each of the first flow channels 413 includes a respective one of a plurality of check valves 415, as best shown in FIG. 4G. The check valves 415 are configured to move between an open position (shown in FIG. 4G) and a closed position. The nature and configuration of the check valves 415 are not limited and any suitable type of check valve may be used.

First modular block 409 further includes a strainer 408, which is configured to fit within the first fluid flow path on an inlet side of the first body 407, i.e., upstream of first flow divider 412, as best shown in FIG. 4H. First body 407 further includes first and second mounting channels (not labeled), which are configured to receive at least a portion of one of connection element 423 and retention element 425 therethrough, as best shown in FIG. 4G. First body 407 also includes a first shoulders 410, which are each configured to abut one of abutment members 405 when first modular block 409 is in its use position.

Second modular block 411 includes a second body 417 with a second fluid flow path extending therethrough. A second flow divider 418 (integral with or separate from second body 417) divides the second fluid flow path into a plurality of second flow channels 419, each of which is axially aligned with a respective one of first flow channels 413. Each of the second flow channels 419 includes a respective one of a plurality of pressure reducing valves 421, as best shown in FIG. 4G. The pressure reducing valves 421 are configured to control (e.g., reduce) the pressure of a fluid flowing through a respective one of the plurality of second flow channels 419. The nature and configuration of the pressure reducing valves 421 are not limited and any suitable type of pressure reducing valve may be used. Second body 417 further includes first and second mounting channels (not labeled), which are configured to receive at least a portion of one of connection element 423 and retention element 425 therethrough. Second body 417 also includes second shoulders 422, which are each configured to abut one of abutment members 405 when second modular block 411 is in its use position.

Second modular block 411 further includes a carrier 420. In general, carrier 420 is configured to support one or more of pressure reducing valves 421 and maintain their alignment within their respective second flow channel 419. In that regard, the carrier 420 may include a plurality of carrier openings, wherein the number of carrier openings corresponds to the number of second flow channels 419. Moreover, the carrier 420 and carrier openings may be configured such that the carrier openings are each axially aligned with a respective one of the plurality of second flow channels 419 and a corresponding one of the plurality of first flow channels. In embodiments and as best shown in FIG. 4I, carrier 420 is configured to fit within the second fluid flow path of second modular block 411 and upstream of second flow divider 418.

FIGS. 4B-4I show modular valve assembly 400 in an assembled condition. As best shown in FIGS. 4B-4G, first frame 401, first modular block 409, second modular block 411, and second frame 403 are arranged in series on connection element 423. More specifically and as shown in FIG. 4G, connection element 423 extends through one of the first and second frame receptacles 447, 447', and through corresponding mounting channels within the first and second bodies 407, 417 of first and second modular blocks 409, 411.

As noted above modular valve assembly 400 includes a retention element 425. Consistent with the foregoing description, retention element 425 is movable between an installed position and a withdrawn position. In the installed position, retention element 425 extends through a portion of first frame 101, first modular block 109, second modular block 111, and second frame 103. This concept is best shown in FIGS. 4C-4F, which depicts retention element 425 extending through another of the first and second frame receptacles 447, 447' in first and second frames 401, 403, and through corresponding mounting channels within the first and second bodies 407, 417 of first and second modular blocks 409, 411. In the withdrawn position (shown in FIGS. 4H and 4I), retention element 425 does not extend through at least one of the first and second frame receptacles 427, 427', and does not extend through at least one of the mounting channels within the first body 407 or second body 417. Without limitation, in the withdrawn position retention element 425 preferably does not extend through the first and second frame receptacles 427, 427', and does not extend through any of the mounting channels within the first body 407 or second body 417.

Figure 4I:
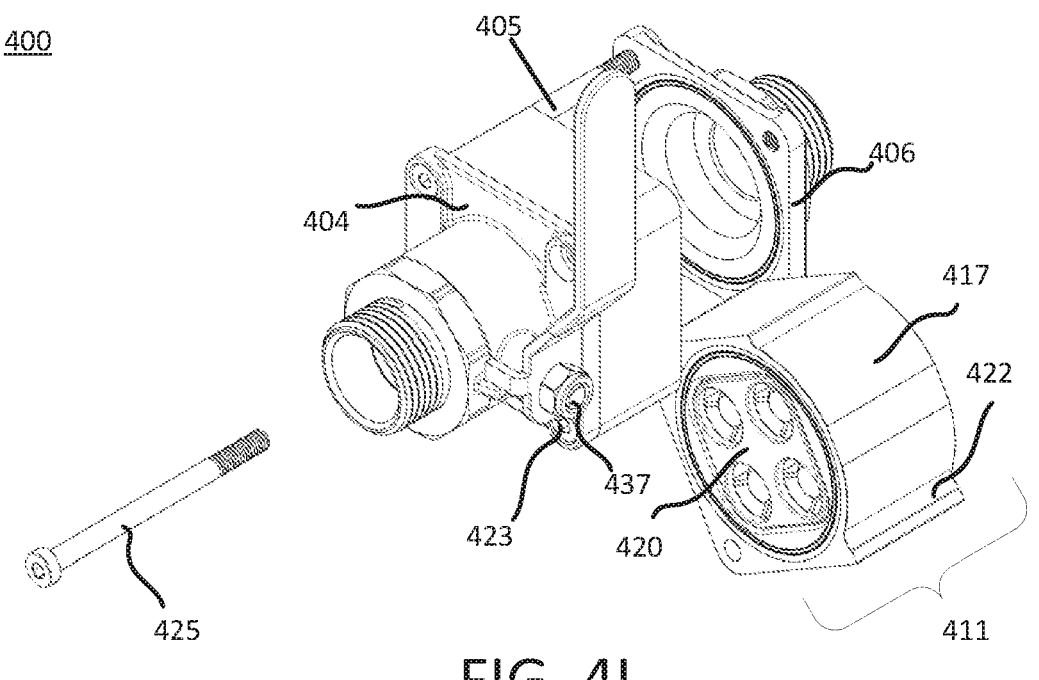
FIG. 4I is a front left side perspective view of the modular valve assembly of FIG. 4A in an assembled state, with a first modular block in a use position and a second modular block in a maintenance position.

Notably when retention element 425 is in the withdrawn position, at least one of first modular block 409 and second modular block 411 may rotate about connection element 423 from a use position (shown in FIGS. 4B-4G), and a maintenance position (shown in FIGS. 4H and 4I). When first modular block 409 and second modular block 411 are in their respective maintenance position (again, shown in FIGS. 4H and 4I), internal components thereof may be accessed by a user. In contrast when first modular block 409 and second modular block 411 are in their use position, the flow channels therein may be aligned with each other and with the inlet fluid flow path 105 and outlet fluid flow path 107, to form a composite flow channel through modular valve assembly 400.

In this example, first body 407 and second body 417 have a quadrilateral shape. Such a configuration is not required, however, and first and second body 407, 417 may have any suitable shape, such as a one, three, four five, six, or more sided geometric shape, or an irregular shape. 1

As best shown in FIGS. 4G-4I, the abutment members 405 each extend between first and second frames 401, 403, and through a pair of first and second frame receptacles 427, 427'. Unlike connection element 423 and retention element 425, however, abutment members 405 do not extend through a portion of the first body 407 of first modular block 409 or the second body 417 of second modular block 411. Rather, abutment members 405 are configured and positioned such that when first modular block 409 and second modular block 411 are in their use position, first shoulders 410 and second shoulders 422 of the first and second bodies 407, 417 abut a respective one of abutment members 405. This concept is best shown in FIGS. 2H and 2I, which show that an abutment member 405 abuts first shoulder 410 and second shoulder 422 when first modular block 409 and second modular block 411 are in their use position. However, the abutment member 405 does not abut first shoulder 410 or second shoulder 422, respectively, when first or second modular block 409, 411 are in their respective maintenance positions.

Like example 1, one or more of connection element 423, retention element 425, and/or abutment members 405 may be in the form of a fastener such as a threaded rod (e.g., a screw, bolt, etc.) that can be tightened to urge first frame 401 and second frame 403 towards each other, compressing first modular block 409 and second modular block 411 therebetween when such modular blocks are in their respective use positions. As best shown in FIG. 4B, in such a condition modular valve assembly 400 includes a first interface 439, second interface 441, and third interface 443. The first interface 439 is formed between the first mount 404 of first frame 401 and a first side of first body 407 of first modular block 409. Second interface 441 is formed between a second side of first body 407 of first modular block 409 and a first side of the second body 417 of second modular block 411. The third interface 443 is formed between a second side of second body 417 and second mount 406 of second frame 401. One or more seals may be provided at such interfaces to limit or prevent leakage of fluid. This concept is best shown in FIG. 4G, which illustrates the use of various seals (e.g., O-rings—not labeled) at the first, second, and third interfaces.

Check valves 415 and pressure reducing valves 421 are configured to be insertable and removable from a corresponding one of first flow channels 413 and second flow channels 419. With that in mind, one or more valve seals (shown but not labeled in FIG. 4G) may be provided around a periphery of each of the check valves 415 and pressure reducing valves 421 to prevent leakage of fluid between each of such valves and a wall of the first/second flow channel in which it is disposed.

As will be appreciated from the foregoing, first frame 401, first modular block 409, second modular block 411, and second frame 403 may be arranged in series on connection element 423. When first and second modular blocks 409, 411 are in their respective use position, the first frame 401, first modular block 409, second modular block 411, and second frame 403 may be urged together by tightening one or more of connection element 423, retention element 425, and/or abutment members 405, resulting in the formation of a composite flow path as discussed above. When maintenance of modular valve assembly 400 is needed, retention element 425 may be removed, connection element 423 may be loosened, and first and/or second modular blocks 409, 411 may be rotated about connection element 423 to their respective maintenance position, as shown in FIGS. 4H and 4I.

Example 4

Figure 5A:
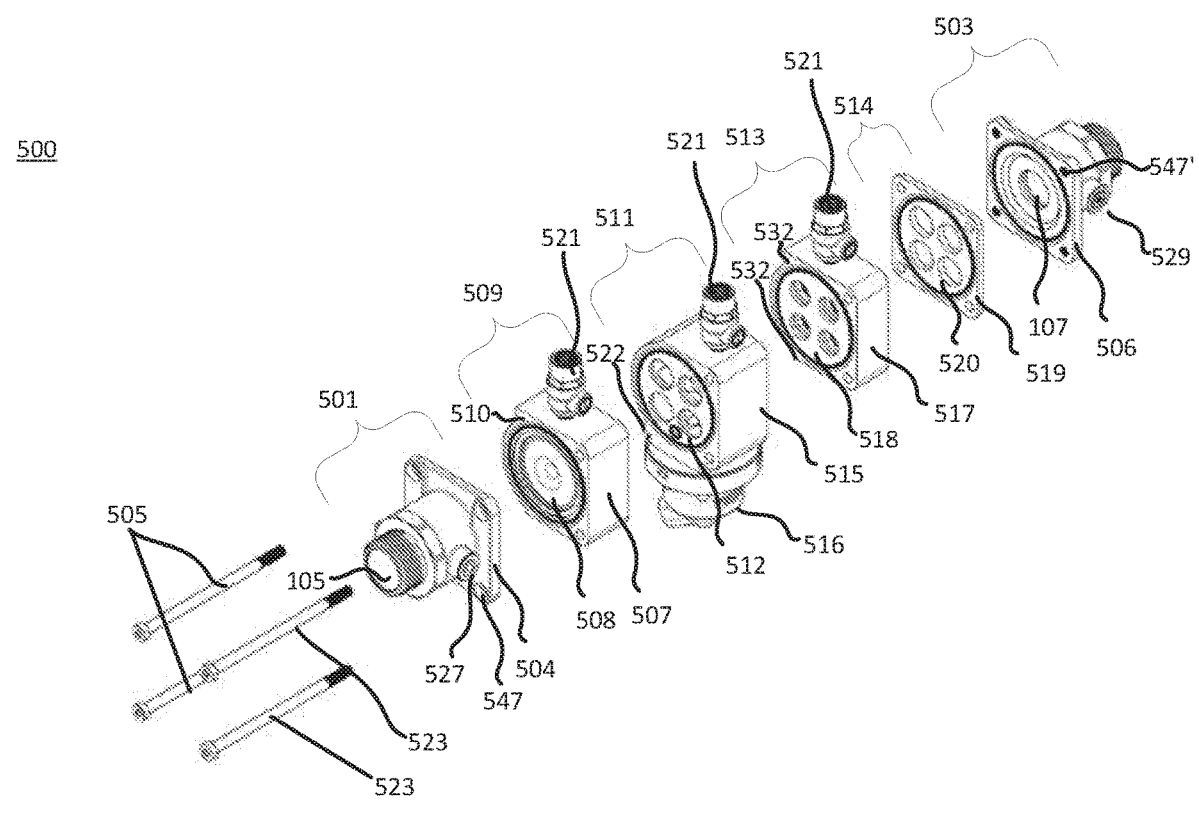
FIGS. 5A and 5B are perspective and top-down exploded views of another example of a modular valve assembly consistent with the present disclosure.
Figure 5B:
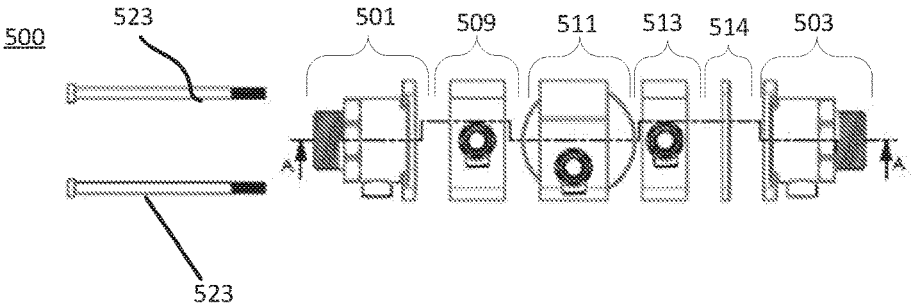

FIGS. 5A-5F illustrate a third example of a modular valve assembly consistent with the present disclosure. With reference to FIGS. 5A and 5B modular valve assembly 500 includes a first frame 501, a second frame 503, a first modular block 509, a second modular block 511, a third modular block 513, a spacer 514, two connection elements 523, and two abutment members 505.

First frame 501 includes an inlet connection, an inlet fluid flow path 105, a first mount 504, and an inlet shutoff valve 527. Likewise, second frame 503 includes an outlet connection, an outlet fluid flow path 107, a second mount 506, and an outlet shutoff valve 529. The inlet and outlet shutoff valves 527, 527 may be any type of valve that can move permit or prevent the flow of fluid through inlet fluid flow path 105 or outlet fluid flow path 107, respectively. As best shown in FIG. 5A, first frame 501 further includes a plurality of first receptacles 547 and second frame 503 further includes a plurality of second receptacles 547'. The first and second receptacles 547, 547' are generally configured to receive one of connection elements 523 or abutment members 505 therein.

Figure 5C:
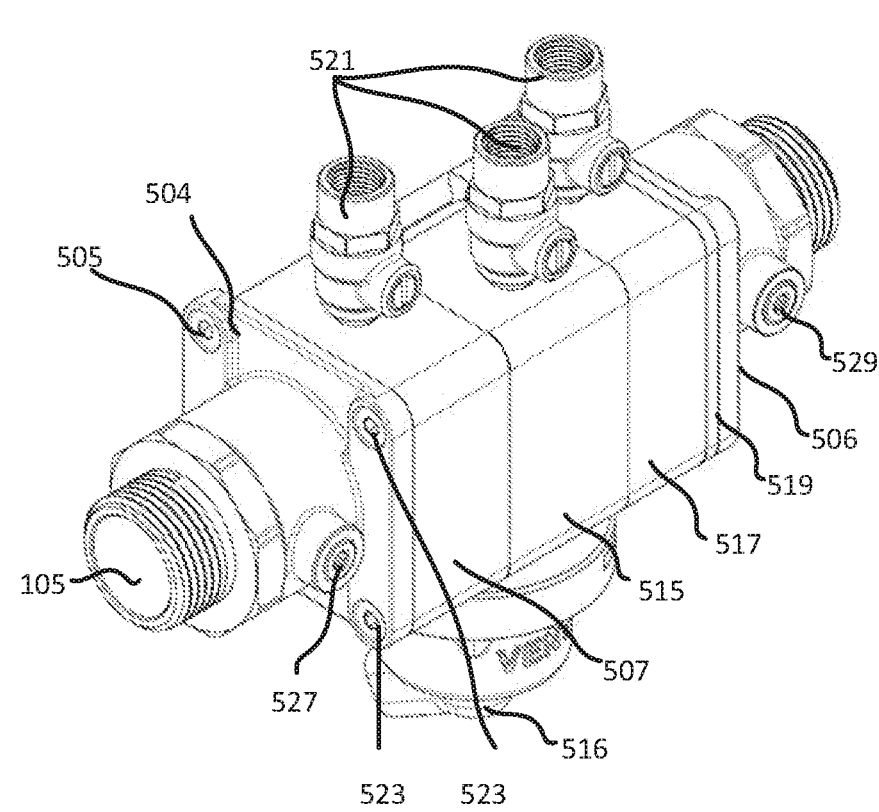
FIG. 5C is a perspective view of the modular valve assembly of FIG. 5A, in an assembled state with all blocks in a use position.
Figure 5D:
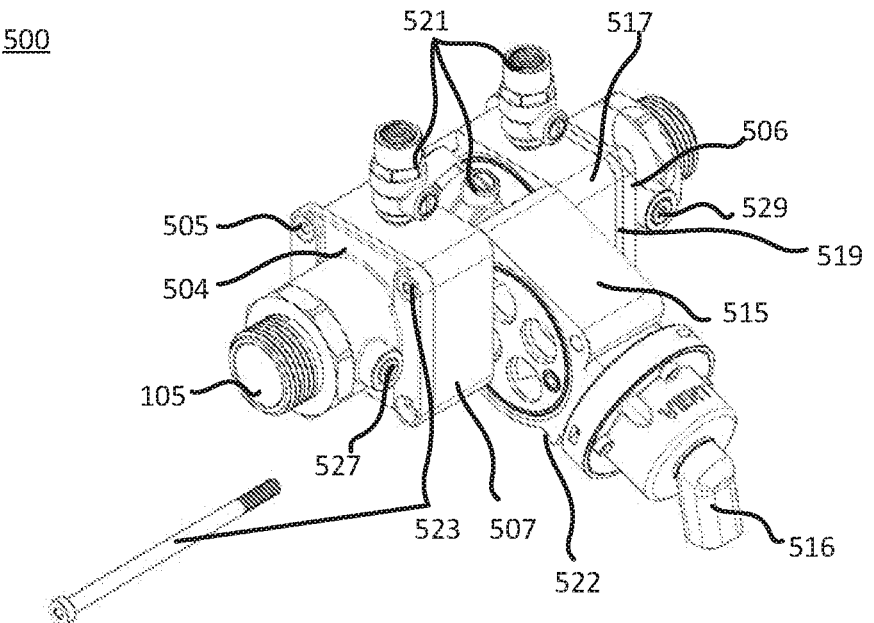
FIG. 5D is a perspective view of the modular valve assembly of FIG. 5A, in an assembled state with a second modular block in a maintenance position and first and third modular blocks in a use position.
Figure 5E:
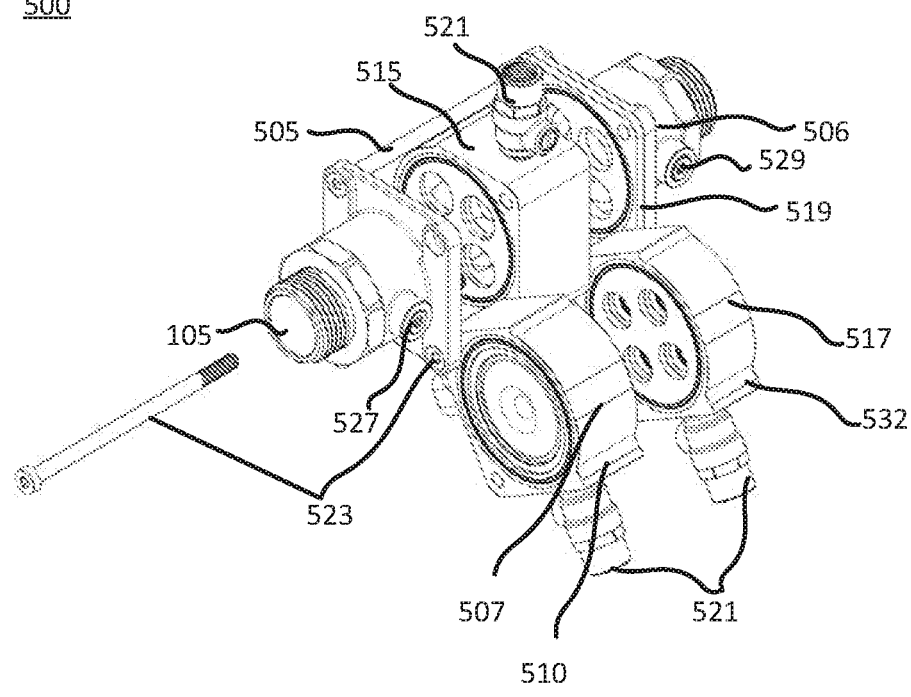
FIG. 5E is a perspective view of the modular valve assembly of FIG. 5A, with first and third blocks in a maintenance position and a second block in a use position.
Figure 5F:
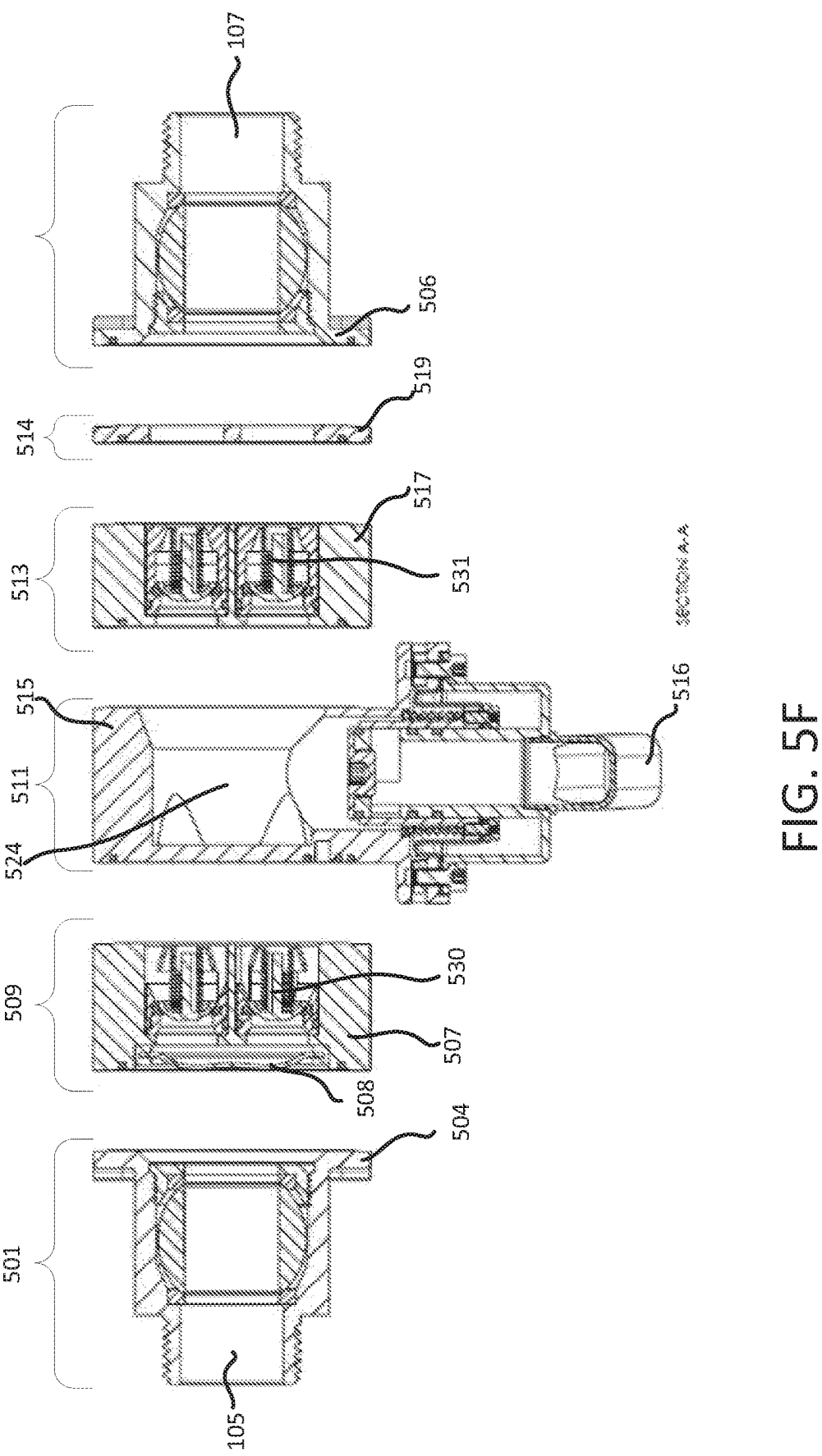
FIG. 5F is a cross sectional exploded view of the modular valve assembly of FIG. 5A, taken along plane A-A as shown in FIG. 5B.

First modular block 509 includes a first body 507 with a first fluid flow path extending therethrough. As best shown in FIG. 5F, first modular block 509 may include a first flow divider (not shown—integral or separate from first body 507) that divides the first fluid flow path therein into a plurality of first flow channels, wherein each of the first flow channels includes a respective one of a plurality of first check valves 530. The first check valves 530 are configured to move between an open position (shown in FIG. 5F) and a closed position. The nature and configuration of the first check valves 530 are not limited and any suitable type of check valve may be used. As further show, first modular block 509 includes a test cock 521 that is configured to enable testing of one or more of first check valves 530.

First modular block 509 further includes a strainer 508, which is configured to fit within the first fluid flow path on an inlet side of the first body 507, i.e., upstream of the first check valves 530 as best shown in FIG. 5F. First body 507 further includes mounting channels (not labeled), which are configured to receive at least a portion of one of connection elements 523 therethrough, as best shown in FIG. 5C. First body 507 also includes first shoulders 510, which are each configured to abut one of abutment members 505 when first modular block 509 is in its use position.

Second modular block 511 includes a second body 515 with a second fluid flow path extending therethrough. A second flow divider 512 (integral with or separate from second body 515) divides the second fluid flow path into a plurality of second flow channels, each of which is axially aligned with a respective one of first the first flow channels in first modular block 509 as shown in FIG. 5F when the first and second modular blocks 509, 511 are in their use position.

Each of the second flow channels may be fluidly coupled to a reduced pressure zone (RPZ) 524 within second modular block 511, as shown in FIG. 5F. The RPZ 524 may be fluidly coupled to a pressure relief valve 516, which may be configured to open when pressure within reduced pressure zone 524 exceeds a set pressure. The nature and configuration of RPZ 524 is not limited and any suitable type of RPZ may be used. As further shown, second modular block 511 further includes a test cock 521, which is configured to enable testing of RPZ 524 and pressure relief valve 516.

Second body 515 further includes mounting channels (not labeled), which are each configured to receive at least a portion of one of connection elements 523. Second body 515 also includes a second shoulder 522, which is configured to abut one of abutment members 505 when second modular block 511 is in its use position.

Third modular block 513 includes a third body 517 with a third fluid flow path extending therethrough. As best shown in FIGS. 5A and 5F, third modular block 513 may include a third flow divider 518 (integral or separate from third body 517) that divides the third fluid flow path therein into a plurality of third flow channels, wherein each of the third flow channels includes a respective one of a plurality of second check valves 531. The second check valves 531 are each configured to move between an open position (shown in FIG. 5F) and a closed position. The nature and configuration of the second check valves 531 are not limited and any suitable type of check valve may be used. As further shown in FIG. third modular block 513 includes a test cock 521 that is configured to enable testing of one or more of second check valves 531.

Third body 517 further includes mounting channels (not labeled), which are configured to receive at least a portion of one of connection elements 523 therethrough, as best shown in FIG. 5C. Third body 517 also includes third shoulders 532, which are each configured to abut one of abutment members 505 when third modular block 513 is in its use position.

Spacer 514 is generally configured to adjust the spacing between the second mount 506 and third modular block 513. Accordingly, spacer 514 includes a fourth body 519 that has a width that may be selected to achieve a desired spacing between third modular block 513 and second mount 506. The fourth body 519 includes a fourth fluid flow path therein. A fourth flow divider 520 (integral or separate from fourth body 519) divides the fourth fluid flow path into a plurality of fourth flow channels. As best shown in FIG. 5F, each of the fourth flow channels is axially aligned with the first, second, and third flow channels within first, second, and third modular blocks 509, 511, 513 when such blocks are in their respective use positions. Fourth body 519 further includes mounting channels (not labeled), which are each configured to receive at least a portion of one of connection elements 523 and one of abutment members 505.

FIGS. 5C-5F show modular valve assembly 500 in an assembled condition. As best shown in FIG. 5C, first frame 501, first modular block 509, second modular block 511, third modular block 513, spacer 514, and second frame 503 are arranged in series on connection elements 523. More specifically, each connection element 523 extends through one of the first and second frame receptacles 447, 447', and through corresponding mounting channels within the first, second, third, and fourth bodies 507, 515, 517, 519 of first, second, and third modular blocks 509, 511, 513 and spacer 514.

Connection elements 523 are each configured to move from an installed position (shown in FIG. 5C) and a withdrawn position (shown in FIGS. 5D and 5E) to facilitate retention of first, second, and third modular blocks 509, 511, 513 and spacer 514, and/or rotation thereof to a maintenance position. For example, and as shown in FIG. 5D, to enable rotation of first, second, or third modular blocks 509, 511, 513 to their respective maintenance positions, one of the connection elements 523 may be moved to its withdrawn position while the other is retained in its installed position. More specifically, to enable rotation of the second modular block 511 to its maintenance position, a first connection element 523 may be withdrawn, while a second connection element 523 may be retained in its installed position as shown in FIG. 5D. In contrast to enable rotation of the first and second modular blocks 509, 513 to their respective maintenance positions, the second connection element 523 may be withdrawn while the first connection element is retained in its installed position.

When first, second, and third modular blocks 509, 511, 513 are in their respective maintenance position, internal components thereof may be accessed by a user. In contrast when first, second, and third modular blocks 509, 511, 513 are in their use position, the flow channels therein may be aligned with each other, with the fourth flow channels in spacer 514, with the inlet fluid flow path 105 and outlet fluid flow path 107, to form a composite flow channel through modular valve assembly 500.

As noted above modular valve assembly 500 further includes two abutment members 505. As best shown in FIGS. 5D and 5E, the abutment members 505 each extend between first and second frames 501, 503, and through a pair of first and second frame receptacles 547, 547'. Unlike connection elements 523, however, abutment members 505 do not extend through a portion of the first, second, third, and fourth bodies 507, 515, 517, 519. Rather, abutment members 505 are configured and positioned such that when first, second, and third modular blocks 509, 511, 513 are in their use position, first, second, and third shoulders 510, 522, 532 abut a respective one of abutment members 505, as best shown in FIGS. 5D and 5E. However, at least one of the abutment members 505 does not abut first, second, and third shoulders 510, 522, 532, respectively, when a respective one of first, second, and third modular blocks 509, 511, 513 is in its maintenance position.

Like example 1, one or more of connection elements 523 and abutment members 505 may be in the form of a fastener such as a threaded rod (e.g., a screw, bolt, etc.) that can be tightened to urge first frame 501 and second frame 503 towards each other, compressing first, second, and third modular blocks 509, 511, 513 and spacer 514 therebetween when such modular blocks are in their respective use positions. As best shown in FIGS. 5C and 5F, in such a condition modular valve assembly includes a plurality of interfaces between adjacent modular blocks and between a frame and an adjacent modular block. One or more seals may be provided at such interfaces to limit or prevent leakage of fluid as best shown in FIG. 5F.

First and second check valves 530, 531 are configured to be insertable and removable from a corresponding one of the first flow channels in first modular block 509 and third flow channels in third modular block 513. With that in mind, one or more valve seals (shown but not labeled in FIG. 5F) may be provided around a periphery of each of the first and second check valves 530, 531 to prevent leakage of fluid between each of such valves and a wall of the first/third flow channel in which it is disposed.

As will be appreciated from the foregoing, first frame 501, first modular block 509, second modular block 511, third modular block 513, spacer 514, and second frame 503 may be arranged on connection elements 523. When first, second, and third modular blocks 509, 511, 513 are in their respective use position, the first frame 501, first modular block 509, second modular block 511, third modular block 513, spacer 514, and second frame 503 may be urged together by tightening one or more of connection elements 523 and/or abutment members 505, resulting in the formation of a composite flow path as discussed above. When maintenance of modular valve assembly 500 is needed, one of connection elements 523 may be removed, the other connection element 523 may be loosened, and first, second, and/or third modular blocks 509, 511, 513 may be rotated about one of the connection elements 523 to their respective maintenance position, as shown in FIGS. 5D and 5F.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A modular valve assembly, comprising:
a first frame comprising a fluid inlet and a first mount and a second frame comprising a fluid outlet and a second mount, the first and the second frame each including a first mounting channel, a second mounting channel, a first receptacle, and a second receptacle;
wherein the first mounting channel, the second mounting channel, the first receptacle, and the second receptacle of the first frame extend through the first mount; and
wherein the first mounting channel, the second mounting channel, the first receptacle, and the second receptacle of the second frame extend at least partially through the second mount;
a connection element;
a retention element;
a first abutment member;
a second abutment member; and
at least a first modular block and a second modular block configured to be positioned between the first frame and the second frame, the first modular block and the second modular block both including:
a first mounting channel and a second mounting channel extending therethrough; and
a first shoulder and a second shoulder;

wherein:
the first modular block and the second modular block are each configured to be independently rotatable about the connection element relative to each other to transition between a use position and a maintenance position;
when the first modular block and the second modular block are in the use position:
the connection element is configured to extend through the first channel of the first frame, the first channel of the first module block, and the first channel of the second module block and to extend at least partially into the first channel of the second frame;
the retention element is configured to extend through the second channel of the first frame, the second channel of the first module block, and the second channel of the second module block and to extend at least partially into the second channel of the second frame;
the first abutment member is configured to extend through the first receptacle of the first frame, to extend at least partially into the first receptacle of the second frame, and to abut the first shoulder of the first module block and the first shoulder of the second module block, wherein the first abutment member does not extend through first module block and the second modular block; and
the second abutment member is configured to extend through the second receptacle of the first frame, to extend at least partially into the second receptacle of the second frame, and to abut the second shoulder of the first module block and the second shoulder of the second module block, wherein the second abutment member does not extend through first module block and the second modular block;
such that a composite fluid flow path extends from the fluid inlet, through a first fluid flow path in the first modular block, through a second fluid flow path in the second modular block, and to the fluid outlet; and
when the first modular block and the second modular block transition from the use position to the maintenance position:
the connection element remains disposed within the first frame and the second frame;
the retention element is removed from the second frame, the first module block, and the second modular block; and
rotation of the first modular block and the second modular block about the connection element to the maintenance position:
causes the first shoulder of the first modular block and the first shoulder of the second modular block to not abut the first abutment member;
causes the second shoulder of the first modular block and the second shoulder of the second modular block to not abut the second abutment member; and
moves the first fluid flow path and the second fluid flow path out of the composite flow path; and
the first modular block comprises a first fixture for controlling or otherwise impacting fluid flow through one or more parts of the modular valve assembly.

2. The modular valve assembly of claim 1, wherein the second modular block comprises a second fixture for controlling or otherwise impacting fluid flow through one or more parts of the modular valve assembly.

3. The modular valve assembly of claim 1, wherein:
the first fluid flow path comprises a plurality of first flow
channels; and
the first fixture comprises a plurality of first fixtures,
wherein each of the plurality of first flow channels
comprises at least one of the plurality of first fixtures.
4. The modular valve assembly of claim 3, wherein the
first modular block comprises a first flow divider that defines
at least a portion of the plurality of first flow channels.
5. The modular valve assembly of claim 3, wherein:
the second fluid flow path comprises a plurality of second
flow channels; and
the second modular block comprises a second fixture for
controlling or otherwise impacting fluid flow through
one or more parts of modular valve assembly, the
second fixture comprising a plurality of second check
valves, wherein each of the plurality of second flow
channels comprises at least one of the plurality of
second check valves.
6. The modular valve assembly of claim 5, wherein:
the first modular block comprises a first flow divider that
defines at least a portion of the plurality of first flow
channels;
the second modular block comprises a second flow
divider that defines at least a portion of the second flow
channels; and
the first flow channels are each axially aligned with a
respective one of the second flow channels.
7. The modular valve assembly of claim 1, wherein:
the connection element is a first rod.
8. The modular valve assembly of claim 1, wherein the
retention element is movable between an installed position
in which it extends through the second channel of the first
frame, the second channel of the first module block, and the
second channel of the second module block and extends at
least partially into the second channel of the second frame,
and a withdrawn position in which it is removed from the
second frame, the first module block, and the second modu-
lar block, wherein:
when the retention element is in the installed position, the
retention element prevents rotation of at least the first
and second modular blocks about the connection ele-
ment; and
when the retention element is in the withdrawn position,
the first and second modular blocks are rotatable about
the connection element.
9. The modular valve assembly of claim 1, wherein:
the retention element is a second rod.
10. The modular valve assembly of claim 1, wherein the
first abutment member is configured to abut against the first
shoulder of the first module block and first shoulder of the
second module block to align the first and second modular
blocks relative to the first frame and the second frame when
in the use position.
11. The modular valve assembly of claim 1, wherein at
least one of the first modular block and the second modular
block comprises a test cock.
12. The modular valve assembly of claim 1, wherein at
least one of the first modular block and the second modular
block comprises a pressure relief valve.
13. The modular valve assembly of claim 1, wherein at
least one of the first modular block and the second modular
block comprises a strainer.
14. The modular valve assembly of claim 1, wherein at
least one of the first modular block and the second modular
block comprises a pressure reducing valve.

15. The modular valve assembly of claim 1, wherein the
first fixture comprises at least one first check valve.
16. The modular valve assembly of claim 15, wherein the
second modular block comprises a second fixture for con-
trolling or otherwise impacting fluid flow through one or
more parts of the modular valve assembly, the second fixture
comprising at least a second check valve.
17. The modular valve assembly of claim 1, further
comprising a third modular block, wherein:
when the first modular block, the second modular block,
and the third modular block are in the use position:
the connection element is configured to extend through
a first channel of the second module block;
the retention element is configured to extend through a
second channel of the third module block;
the first abutment member is configured to abut a first
shoulder of the third module block; and
the second abutment member is configured to abut a
second shoulder of the third module block such that
the third modular block is rotatable about the con-
nection element between the use position and the
maintenance position; when the first, second, and
third modular block are in the use position, the
composite fluid flow path also extends through a
third fluid flow path in the third modular block; and
when the third modular block is in the maintenance
position:
the connection element remains disposed within the
first frame and the second frame;
the retention element is removed from the third modu-
lar block; and
rotation of the third block about the connection element
to the maintenance position:
causes the first shoulder of the third modular block to
not abut the first abutment member;
causes the first shoulder of the third modular block to
not abut the second abutment member; and
moves the third fluid flow path out of the composite
flow path.
18. The modular valve assembly of claim 17, wherein the
third modular block is between the first and second modular
blocks.
19. The modular valve assembly of claim 18, wherein:
the first fixture comprises a first check valve;
the second modular block comprises a second fixture for
controlling or otherwise impacting fluid flow through
one or more parts of the modular valve assembly, the
second fixture comprising a second check valve; and
the third modular block comprises a third fixture for
controlling or otherwise impacting fluid flow through
one or more parts of the modular valve assembly, the
third fixture comprising a third check valve.
20. The modular valve assembly of claim 19, wherein:
the first fluid flow path comprises a plurality of first flow
channels;
the first fixture comprises a plurality of first check valves,
each of the plurality of first flow channels comprising
a respective one of the plurality of first check valves;
the second fluid flow path comprises a plurality of second
flow channels;
the second fixture comprises a plurality of second check
valves, each of the plurality of second flow channels
comprising a respective one of the plurality of second
check valves;
the third fluid flow path comprises a plurality of third flow
channels; and the third fixture comprises a plurality of third check valves, each of the plurality of third flow channels comprising a respective one of the plurality of third check valves.

21. The modular valve assembly of claim 20, wherein:

each of the plurality of first flow channels is axially aligned with a respective one of the plurality of second flow channels; and each of the plurality of first flow channels is axially aligned with a respective one of the plurality of third flow channels.

22. The modular valve assembly of claim 19, wherein at least one of the first, second, and third modular blocks comprises a test cock.

23. The modular valve assembly of claim 22, wherein each of the first, second, and third modular blocks comprises a test cock.

\* \* \* \* \*